(12) United States Patent
Rabb, III

(10) Patent No.: US 7,002,583 B2
(45) Date of Patent: Feb. 21, 2006

(54) DISPLAY OF IMAGES AND IMAGE TRANSITIONS

(75) Inventor: Maurice F. Rabb, III, Chicago, IL (US)

(73) Assignee: Stono Technologies, LLC, Chicago, IL (US)

(*) Notice: Subject to any disclaimer, the term of this patent is extended or adjusted under 35 U.S.C. 154(b) by 395 days.

(21) Appl. No.: 09/922,498

(22) Filed: Aug. 2, 2001

(65) Prior Publication Data

US 2002/0075284 A1 Jun. 20, 2002

Related U.S. Application Data

(60) Provisional application No. 60/223,295, filed on Aug. 3, 2000.

(51) Int. Cl.
*G06T 15/70* (2006.01)

(52) U.S. Cl. ............... 345/473; 345/646; 345/959; 345/960; 348/564

(58) Field of Classification Search ............... 345/646, 345/723, 473, 474, 475, 959, 960, 949, 955, 345/967, 810; 348/564
See application file for complete search history.

(56) References Cited

U.S. PATENT DOCUMENTS

| 5,353,391 | A | | 10/1994 | Cohen et al. |
| 5,359,712 | A | * | 10/1994 | Cohen et al. ............... 345/723 |
| 6,057,833 | A | * | 5/2000 | Heidmann et al. .......... 345/726 |
| 6,411,338 | B1 | * | 6/2002 | Neill .......................... 348/564 |
| 6,504,545 | B1 | * | 1/2003 | Browne et al. ............. 345/473 |

FOREIGN PATENT DOCUMENTS

WO     WO 00/43956     7/2000

* cited by examiner

*Primary Examiner*—Kimbinh T. Nguyen
(74) *Attorney, Agent, or Firm*—Thomas F. Lebens; Fitch, Even, Tabin & Flannery

(57) ABSTRACT

The present invention consists of a method comprising the steps of displaying an image representing a source value; displaying an image representing a destination value; and displaying a transition image; wherein the transition image is a function of the source value and the destination value. Additionally, the present invention consists of an apparatus comprising: a graphics display device; a memory; a timing unit; and a processing unit coupled to the memory, the timing unit and the graphics display device; wherein the processing unit is configured to provide a transition from a first static value to a second static value; wherein the transition is a function of the first static value and the second static value.

6 Claims, 25 Drawing Sheets

*Visual Manifestation of Dynamated Indicator*

The next possible value is limited by the current value

DISPLAY OF IMAGES AND IMAGE TRANSITIONS

This patent document claims priority to U.S. provisional patent application Ser. No. 60/223,295, filed Aug. 3, 2000, by Rabb, for DYNAGLYPHS, the entirety of which is incorporated herein by reference.

BACKGROUND OF THE INVENTION

The present invention relates to the display of images, and more particularly to the display of a transition between one member of a value set to another member of a value set. Even more particularly, the present invention relates to the display of a unique transition between a first member of a value set to a second member of a value set (which may be the same member as the first member of the value set), the value set including a multiplicity of members, the unique transition being defined uniquely as a function of the first member of the value set and the second member of the value set.

It is well known in the art that a static image, e.g. a photograph, can be converted into a digital representation of the static image. Similarly, it is well known in the art to convert dynamic images, i.e., video images, into a digital representation. Typically, in the digital representation on, for example, a computer system, the video image is captured as a sequence of static images. Each static image captures an instant in time of the video image. Movement is apparent to the viewer by the rapid display of the sequence of static images.

It is often the case where a first collection of video images is contiguously merged with or transitioned into, a second collection of video images. Common techniques known in the art that are used for creating a transition from one video image to a second video image are called "switches". Such "switches" include cuts, wipes, rises, fades and pushes. It should be noted that switching is used in the context of live television broadcasts; where, for example, during a newscast, when a switch is made from a newsperson reporting the weather to a newsperson reporting sports.

As described above, a video image in its digital representation is typically a sequence of static images. It is these sequences of static images which are processed to create a transition.

Heretofore, however, the transition from one static image (or one video image) to another static image (or another video image) has not been performed as a function of the one static image (or one video image) or the other static image (or other video image), but rather has performed a single, specific manipulation of the one static image (or one video image) into the other static image (or video image). For example, in the case of a wipe, the other static image (or other video image) wipes across the one static image (or one video image), so as to replace the one static image (or one video image). This is performed in exactly the same manner, regardless of the one static image (or one video image) and the other static image (or other video image).

By way of example, a method and apparatus for transitioning between sequences of images is disclosed in U.S. Pat. No. 5,353,391. The '391 patent discloses a method and apparatus for generating and viewing a transition between a first and second sequence of images on a computer controlled display system. The method described involves several steps, including: providing a first and second sequence of digitized images, which are typically stored in the computer system; providing the duration of total time of the transition between the first and second sequence of images; providing a transition resource for specifying the transition between the first and second sequence; determining a first portion of the first sequence of images (the first portion having a duration in time less than or equal to the duration of the transition); determining a second portion of the second sequence (the second portion of the second sequence of images having a duration in time less than or equal to the duration of the transition); creating a transition template from the transition resource, the transition template having a duration equal to the transition; and combining the first portion of the first sequence and the second portion of the second sequence with the transition template to thereby produce a third sequence of images. The step of creating a transition template from the transition resource is further comprised of the steps of selecting objects, interpolating objects and/or a source image area and mapping objects to a source image area. In the combining step, the transition template is used to determine which portions of the first source sequence, the second source sequence, or both will be displayed in the third sequence of images. Also provided is a means for modifying a duration of the entire transition or for modifying a duration of individual frames within the transition.

Thus, as suggested above, there are currently no animated indicators that fully enumerate a unique transition for the entire matrix of possible transitions from each value in a value set to any other value in the value set. I.e., there are currently no animated indicators in which the transition from one static image (or one video image) to another static image (or another video image) is performed as a function of the one static image (or one video image) or the other static image (or other video image).

There are animated indicators which enumerate a subset of possible transitions, and, as described above, those that provide a generic inexpensive means of transitioning from any value to any other.

The present invention advantageously addresses the above and other needs.

SUMMARY OF THE INVENTION

The present invention advantageously addresses the needs above as well as other needs by providing a system and method for the display of a transition between one member of a value set to another member of a value set, the value set including a multiplicity of values, the transition being defined as a function of the member of the value set and the other member of the value set.

In one embodiment, the invention can be characterized as a method comprising the steps of receiving a source value from a source value set, the source value set comprising a plurality of source values; receiving a destination value from a destination value set, the destination value set comprising a plurality of destination values; and generating a transition sequence as a function of the source value having been received, and the destination value having been received.

In another embodiment, the invention can be characterized as a method comprising the steps of displaying an image representing a source value; displaying an image representing a destination value; and displaying a transition image; wherein the transition image is a function of the source value and the destination value.

In a further embodiment, the invention can be characterized as an apparatus comprising a graphics display device; a memory; a timing unit; and a processing unit coupled to the memory, the timing unit, and the graphics display device; wherein the processing unit is configured to provide a transition from a first static value to a second static value; wherein the transition is a function of the first static value and the second static value.

In an additional embodiment, the invention can be characterized as a apparatus comprising a memory; wherein the memory contains code configured to provide a transition from a source value to a destination value; wherein the transition is a function of the source value and the destination value.

In another embodiment, the invention can be characterized as a method comprising the steps of creating a source value group; creating a destination value group; and creating a transition from a member of the source value group to a member of the destination value group; wherein the transition is a function of the member of the source value group and the member of the destination value group.

In an additional embodiment, the invention can be characterized as a method of displaying an image comprising displaying a first glyph, the first glyph comprising a plurality of sub-glyphs; manipulating the sub-glyphs; and displaying a second glyph.

In a further embodiment, the invention can be characterized as a method of displaying an image comprising generating a source value; generating a multiplicity of destination values; and generating a different transition from the source value to each of the destination values.

In another embodiment, the present invention can be characterized as a method of displaying an image comprising generating a multiplicity of source values; generating a destination value; and generating a different transition from each of the source values to the destination value.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

Figure 1:
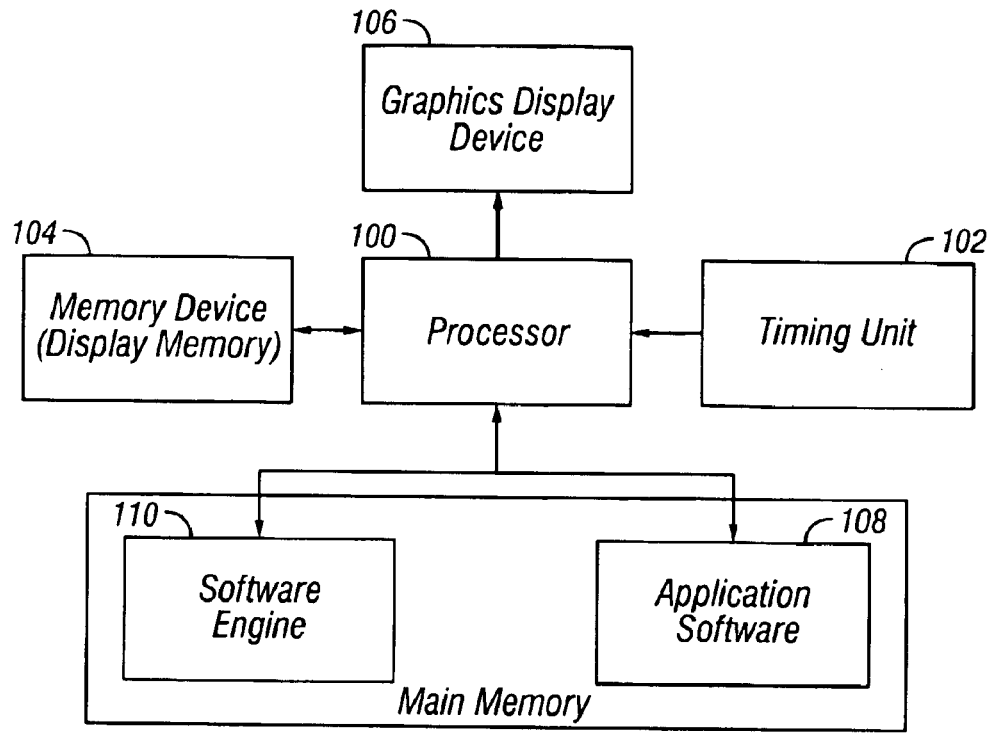
FIG. 1 is a block diagram illustrating a dynamated indicator apparatus in accordance with one embodiment of the present invention is shown.

The following description of the presently contemplated best mode of practicing the invention is not to be taken in a limiting sense, but is made merely for the purpose of describing the general principles of the invention. The scope of the invention should be determined with reference to the claims.

The present embodiment is a new processor-implemented system and method for using and displaying an animated indicator. The animated indicator displays a static value (or static image), or the transition from one static value (or one static image) to another static value (or another static image).

The static value (or any intermediate value displayed during a transition from one static value to another static value) is composed of a plurality of display objects. Each of these display objects displays a visual symbol known as a glyph, or the transition from one glyph to another. Each glyph is a unique member of an alphabet of glyphs. Glyph alphabets are composed of no less than two members. Glyphs can represent a symbol, code, or index. Typically they represent numerals, alphanumeric characters, or other special characters.

Every alphabet of glyphs can have a plurality of animation styles associated with it. An animation style defines the specific visual representation of each glyph when static, and defines the set of transitions from each glyph to another glyph. Together, a group of glyphs is used to represent a value to be displayed by the indicator. The visual representation of the value is determined by; the collective styles of the glyphs of the display objects composing the displayed value.

The indicator displays a transition from one value to another by showing the plurality of the display objects composing said value in various states of transition. The indicator, its composing display objects, and the animation styles are known as the indicator model.

Just as there is an alphabet of glyphs, there is a set of valid values that can be displayed on the indicator. The set is referred to herein as the valid value set. Maximally, this set consists of every permutation of the N glyphs composing the value, and the M glyphs that compose the glyph alphabet. This set is known as the complete value set, and contains $M^N$ members. Typically, the valid value set consists of all of the values of a counter, timer, or clock; or a set of text words composed of (either or both upper and lower case) characters of a human language alphabet.

In accordance with the present embodiment, an animation style can be set for each of the plurality of glyphs that compose the representation of the value. They can be set either individually or as a group. The present embodiment is able to receive inputs which change a plurality of glyphs to an existing animation style, or a newly specified style which is included within an input, at a specified animation time index. The input can be received before any animation begins, or in real-time as the indicator is in process of performing a transition.

The present embodiment further preferably includes the following characteristics: the present embodiment is able to display every possible transition from any value to any other value in the valid value set (the set of value transitions is not limited to a sequential subset, a random subset, or any other subset of the complete value transitions set); the present embodiment is able to receive inputs specifying to which of any value in the value set the indicator should perform a transition (the indicator performs the transition to the specified value in a unique continuous manner, in that it proceeds without transitioning through any other values; the indicator is able to directly perform any transition in the complete value transitions set); the present embodiment is able to receive inputs specifying that the indicator should transition from any specified value, from a current value, or from a future value, to any other specified value, beginning at a particular animation time index, and finishing at another animation time index (the input can be received before any animation begins, or in real-time as the indicator is in process of performing a transition); the present embodiment is able to receive an input that will change a plurality of properties of the indicator model, at a specified animation time index, or over a span of specified animation time indices (the input can be received before any animation begins, or in real-time as the indicator is in the process of performing a transition); all glyph transitions can be defined by a style are mutually unique (no glyph transition will visually match any other glyph transition defined by the style); all value transitions in a complete set of value transitions can be mutually unique (no value transition visually matches any other value transition); each glyph transition can be uniquely specific to the start and stop glyph pair (every glyph transition depends not only on the visual manifestation of the glyph pair, but also on transition specific method and/or data); every transition can involve a means of transmogrification that is not general purpose, i.e. such that it can be applied in the exact same manner to achieve a transition from any glyph to any other glyph; examples of such general purpose techniques, include fading in and out, shimmering, sparkling, simple scrolling, or any other raster-based transformation); at no point in a value transition will the indicator display a visual representation such that it appears that the start or stop value of the transition is simply being translated over the boundary area of the respective stop or start value; every glyph transition can be either a single unique continuous transition, or can use three or more concatenated independent partial transitions via intermediate states (these partial transitions may be shared in forming other complete glyph transitions; if a glyph transition involves a concatenation of two independent partial transitions via an intermediate state, this intermediate state is not shared by all other glyph transitions in forming their complete glyph transitions.

An indicator which embodies these features is referred to herein as a dynamated indicator.

A novel combination of techniques, in accordance with the present embodiment, to model the visual representation of glyphs, substantially reduces the amount of effort required to fully specify the $M^2$ transitions and store transition specification information. The principal technique is the hierarchical decomposition of the common visual subelements that make up a style's representation of a symbol.

Referring first to FIG. 1, an apparatus in accordance with the present embodiment is composed of a processor (CPU) 100, a timing unit 102, a memory device 104, a graphics display device 106, application software 108, and a software engine 110. The application software 108 embodies the overall purpose and function of the apparatus, i.e., the business methods, which can be virtually any overall purpose and function, while the software engine 110 manages the display of values in accordance with the principles of present embodiment. The overall purpose and function performed by the application software 108 is not essential to the present embodiment, which instead focuses on the display of an indicator.

The software engine 110 manages an indicator model, and is used by the application software 108. The software engine 110 receives input from the application software 108 to make changes to the indicator model, and causes the indicator model to animate, i.e., to transition from one value to another value. The processor 100 provides the software engine 110 access to the display memory 104. Periodically, the software engine 110 updates the display memory with the current visual state of the indicator.

The indicator model is an object that represents the state of the indicator. The indicator model contains the display objects that represent the glyphs that compose the value of the indicator. The indicator model also holds animation styles that specify the visual representation of the glyphs.

Styles are user-defined objects. The "user" in the context of the present embodiment is not the end user of the apparatus, but the implementer of the apparatus, e.g., a software developer, who is making use of the software engine 110 in performing the business methods embodied in the application software 108.

Thus the heart of the present embodiment is the software engine 110. The software engine 110 is used as a utility by the application software 108 (or a plurality of programs) to display one or more indicators. The application software 108 is software external to the software engine 110, and provides some other functionality, or business method or process. The software engine 110, as embodied presently, is not meant to be used on its own, but as a service to the application software 108. It is envisioned, however, that the software engine 110 and the application software 108 could be combined, to provide for the display of indicators, as performed by the software engine 110, and the performance of business methods, as performed by the application software 108, in a single unit of software.

Figure 2:
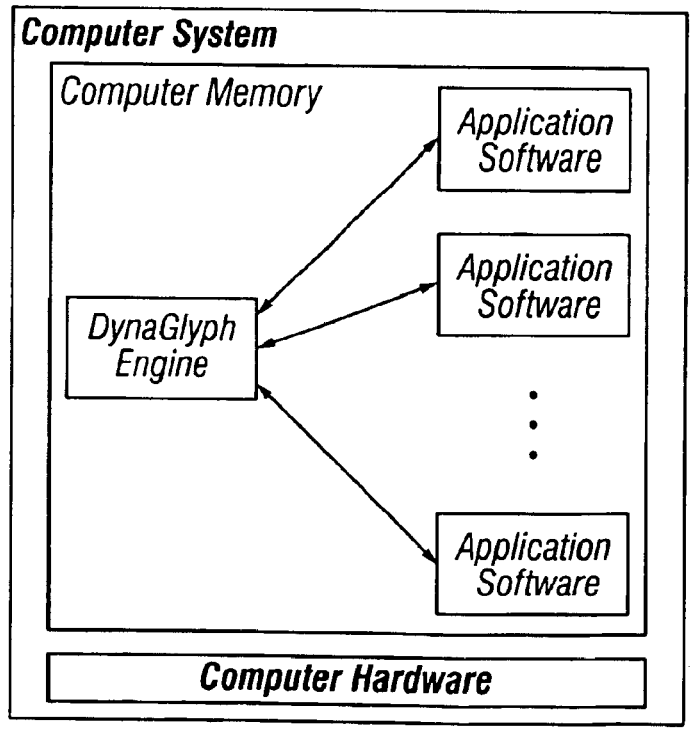
FIG. 2 is a block diagram of a software engine and a plurality of application software systems in a computer memory such as in one variation of the dynamated indicator apparatus of FIG. 1.
Figure 3:
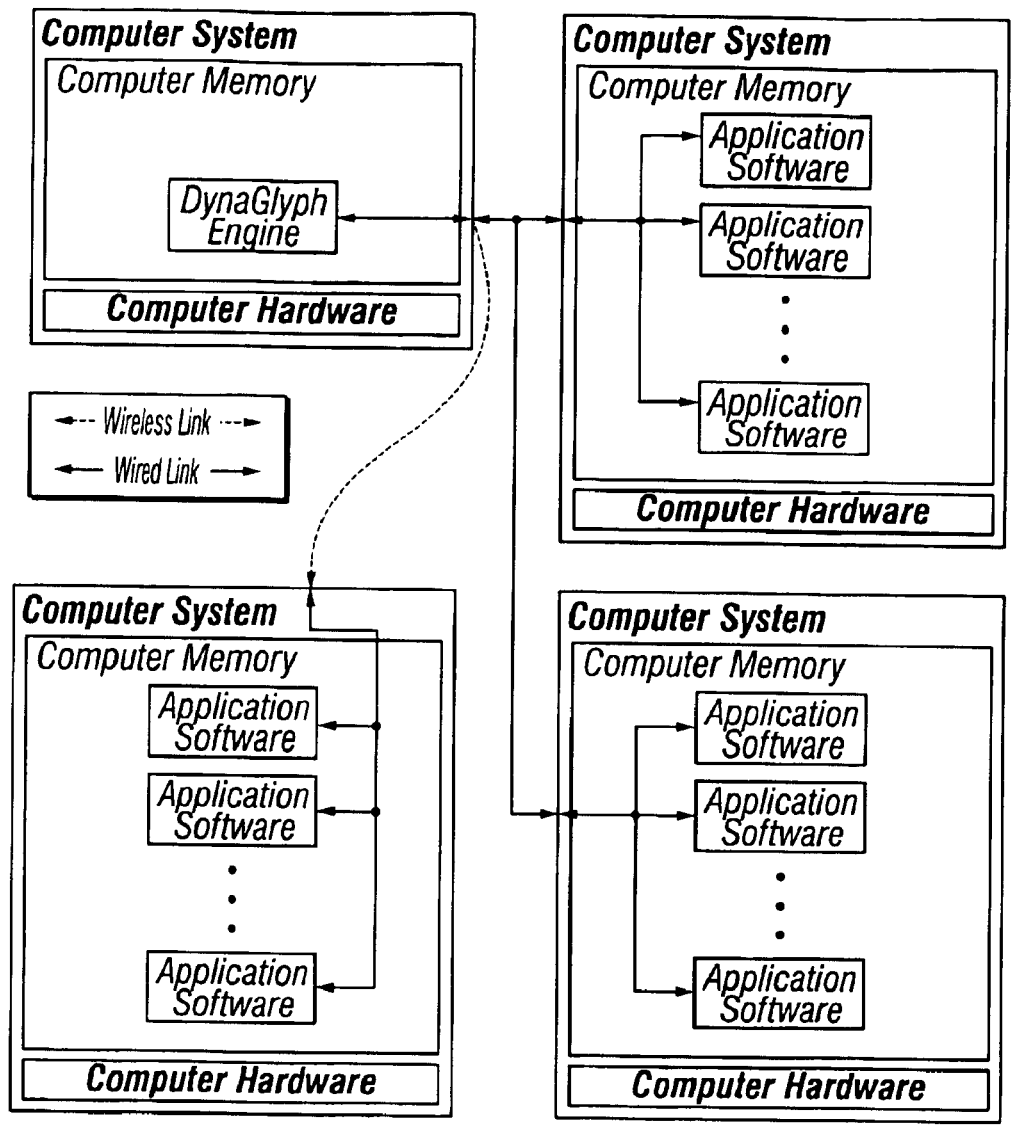
FIG. 3 is a block diagram of a software engine and a plurality of application software systems in a plurality of computer memories coupled to one another via a computer network such as in another variation of the dynamated indicator apparatus of FIG. 1.

The software engine 110 and the application software 108 can exist in computer memory on the same computer system, such as shown in FIG. 2, or on separate computer systems which make use of some wired or wireless communications link, e.g., a network, such as in FIG. 3.

Figure 4:
FIG. 4 is a block diagram illustrating communication between a software engine, and application software of one variation of the dynamated indicator apparatus of FIG. 1.

The software engine 110 receives input from the application software 108 which controls the functions of the software engine 110. This input is in the form of commands which (1) create a new dynamated indicator, (2) destroy an existing dynamated indicator, or (3) set properties of a dynamated indicator. Any of the commands can be specified to occur immediately, at a particular time, or over a period of time. In response to the commands the software engine 110 produces image data which is output back to the application software 108, see FIG. 4.

In order to make use of the present embodiment an implementor must implement a specific set of software components (hereafter "objects").

Figure 5:
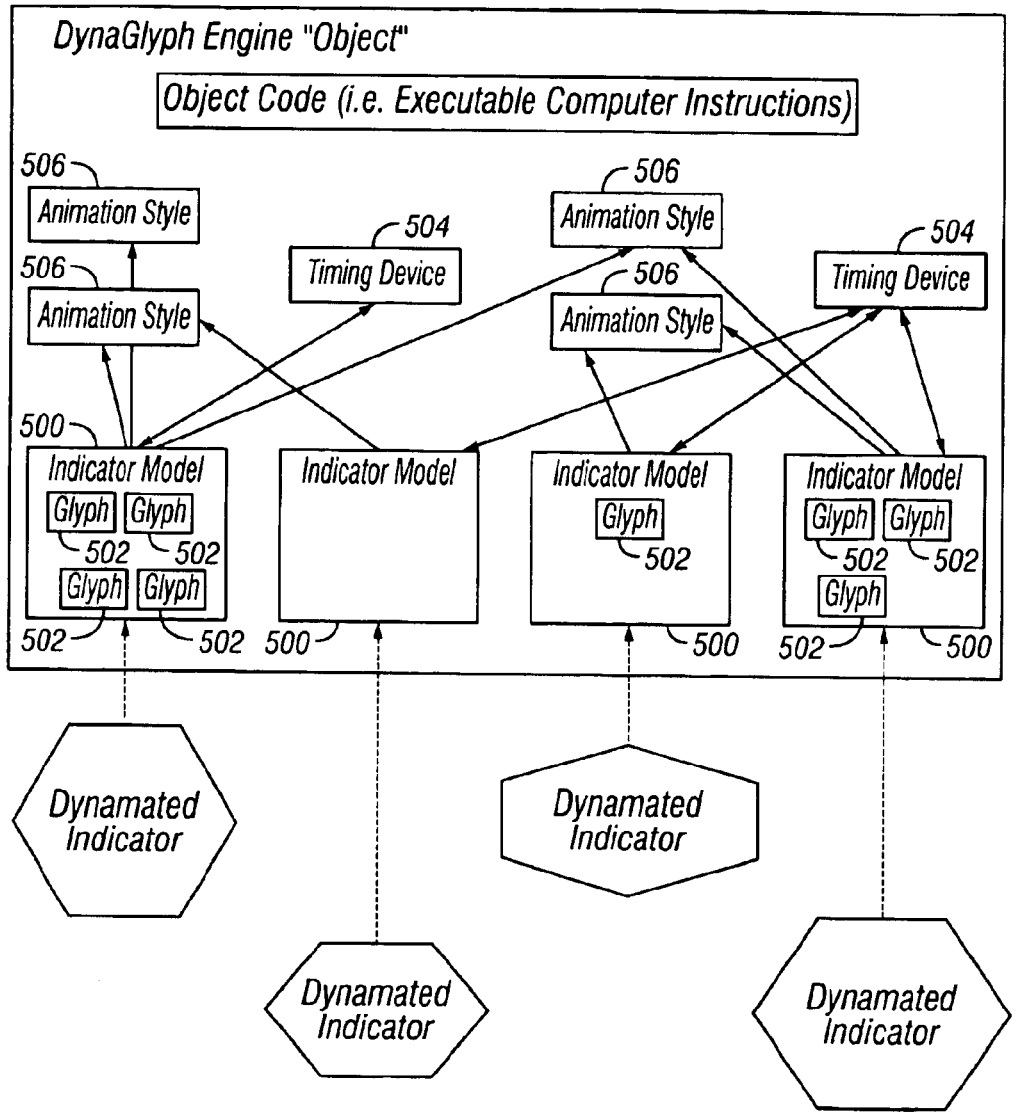
FIG. 5 is a block diagram describing software objects that comprise the software engine of FIG. 4.

Referring to FIG. 5, the software engine is composed of following software objects:

One or more indicator models 500;

Zero or more glyphs 502;

One of more software timing devices 504 (i.e., software components that interfaces with the timing device); and One or more animation styles 506.

There is one indicator model 500 for each dynamated indicator that the software engine 110 (FIG. 1) is currently managing for the application software 108. Each indicator model 500 is composed of zero or more glyphs 502, and each indicator model 500 is associated with one or more animation styles. An indicator model 500 manages the production of its images using its associated animation styles 506. Each indicator model 500 is also associated with a single software timing device 504, as shown in FIG. 5. The software timing device 504 supplies one or more associated indicator models 500 with a timing input to signal that the data for the next image should be produced.

It should be noted that there is no explicit software engine "object". The software engine 110 (FIG. 1) consists of the object code (i.e. executable computer instructions), along with the software timing devices 504, animation styles 506, indicator models 500, glyphs 502, and other objects contained in the main memory.

The present embodiment is divided into two logical/functional segments: models which manage data, and styles which manage the production of images for models. An indicator model 500 collaborates with its associated animation style(s) 506 to define its current image.

Within the software engine 110 there is no explicit dynamated indicator software object. A dynamated indicator is the composition of an indicator model 500 with its glyphs 502, associated animation styles 506, and associated software timing device 504. Together these objects form a dynamated indicator. Hereafter, "indicator" or "indicator object", shall mean indicator model. When referring to the composition, the term dynamated indicator will be used.

The present embodiment determines a set of valid values that an indicator model 500 can represent. This set of valid values can include any unique values which are ultimately representable by viewable images. This set is known as the indicator model's alphabet.

EXAMPLE 1

Figure 6:
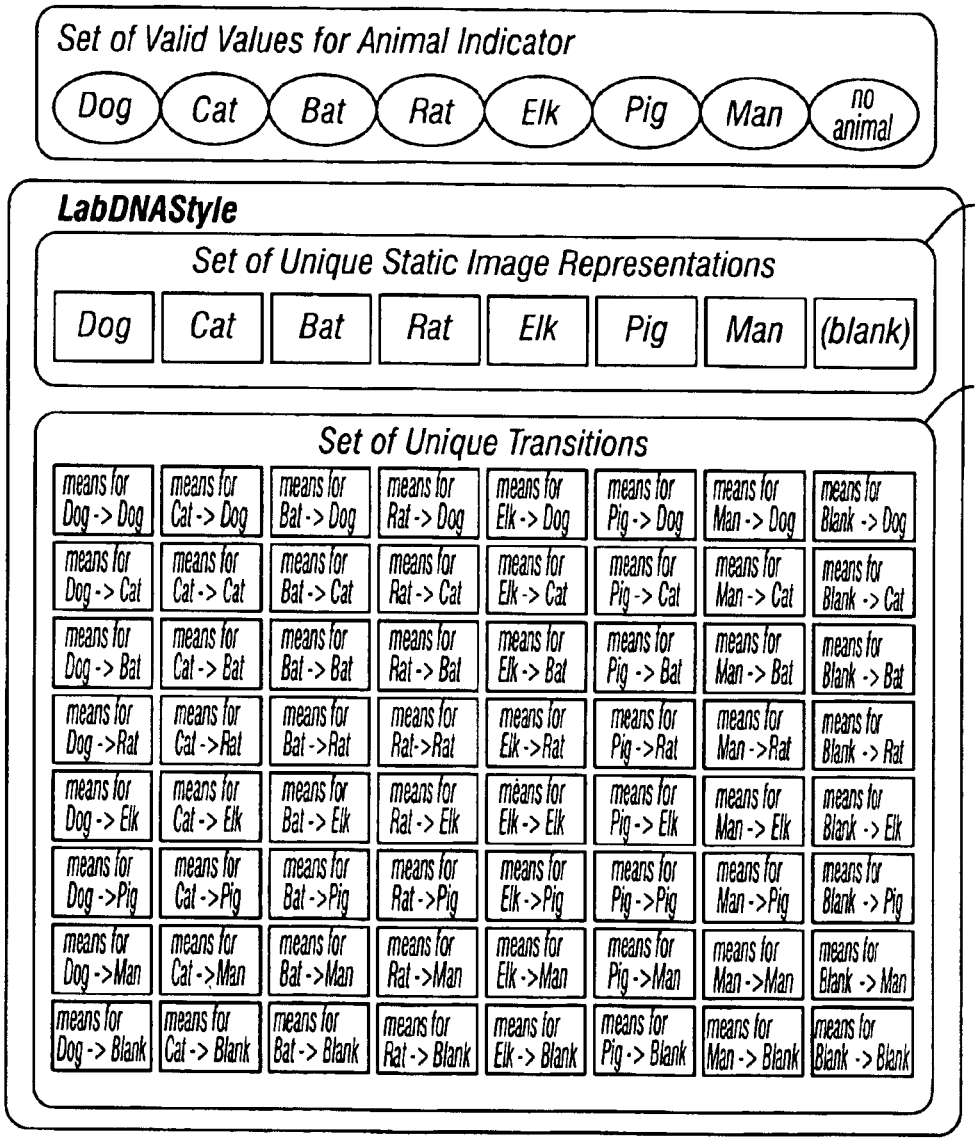
FIG. 6 is a block diagram illustrating a valid value set, a set of static image representations, and a fully described set of unique transition sequences for the valid value set, such as may be used in the software engine of FIG. 4.

Referring to FIG. 6, a dynamated animal indicator is illustrated which shows a set 600 of images of different animals: dog, cat, bat, rat, elk, pig, or man. A no-animal value is also defined for when no animal is to be shown in the dynamated indicator. As defined, the alphabet consists of eight unique values. Thus, in accordance with the present embodiment, the AnimalIndicator will have at least 64 unique transitions (8*8) in a set of unique transitions 602.

An indicator model is always in one of two generalized states, a static value-state or a dynamic value-state. If the indicator model is not in a state of transition, the indicator model is considered to be in a static state (or static value-state). The indicator model's value-state in a static state is defined as its current value amongst its set of valid values. While there are many properties that can be associated with an indicator model, the value-state is its primary property.

If an indicator model is in transition between two of it values, it is considered to be in a dynamic state. The indicator model's value-state in a dynamic state is defined as a previous value of its value-state in a static state and a next value of its value-state in a static state, to which the indicator model is in transition, along with a current step value. These two value-states, i.e., the previous value-state and the next value-state, are known as a source-destination pair (abbreviated as src-dst). Thus, when the indicator model is in a dynamic state its value-state is its current src-dst pair, along with the current step value. The current step value represents how far the indicator model has progressed from its previous value-state to its next value-state. The implementation of the current step value is immaterial, but preferably can be normalized into a parametric unit value between 0.0 and 1.0.

While there are many properties that can be associated with an indicator model, the value-state is its primary property.

As mentioned above, every indicator model is associated with a software timing device. In a software engine of the present embodiment the software timing device provides an interface to the system's timing device (such as by providing a conversion from real time to relative time). Each software timing device converts the system's timing device to conform to time-indexing scale (also referred to as a timescale) for the particular indicator model (or set of commonly timed indicator models).

When the software engine receives a command from the application software to set a property of a dynamated indicator at a specific time instant or over a time span, the software timing device associated with the indicator model manages the execution of the command as a function of time. The device stores the command until it is time to be executed on the indicator model. When the time instant for execution of the command occurs, the device signals the execution of the command on the indicator model, producing, e.g., new output image data. If the command is for an action that occurs over a time span, the software timing device signals the indicator model periodically to continue the action, updates the indicator model's state and/or properties, and produces new output images over the time span.

Every software timing device can be associated with one or more indicator models, i.e., one indicator model or a set of common-timed indicator models. However, each indicator model is only associated with a single software timing device. Like an indicator model, a software timing device can be associated with one or more animation styles. A software timing device's style(s) can be used as the default style(s) for its associated indicator models.

By default the present embodiment fully implements software timing devices. The implementor does not need to implement a new software timing device to work with any indicator models or animation styles implemented.

An animation style manages the visual representing of an indicator model. The implementor defines at least one animation style to be associated with a dynamated indicator. An animation style can be associated with more than one indicator model. An indicator model can use more than one animation style to define separate aspects of its look. There is no limit to the number of animation styles that an implementor can define.

Like indicator models, animation styles define a set of valid values. The implementor must define a set of static images which correspond to each value of a style's alphabet. For an animation style to be associated with an indicator model the animator style must define a unique static image for every one of the values in the indicator model's valid set. In other words the animation style's set of valid values must be completely inclusive (i.e. a super-set) of the indicator models valid set. The implementor must also define an animation style to have a unique transition for all src-dst pairs of all associated indicator models. Together, the static images and the unique transitions are the principle properties of an animation style.

The static images form the basis of an animation style and define the basic look of a dynamated indicator. The implementor usually follows a consistent visual theme when designing the static images, however, there is no requirement that an animation style conform to some human-defined or human-comprehendible aesthetic. The only requirement for the static images is that they are visually unique from one another.

It is immaterial how the static images are represented. When referring to an "image," it can mean either image data or a means of generating an image. Each static image can be represented as actual image data (e.g. bitmapped or vector data), as a set of computer instructions, or as a hierarchy of sub-structures. All of these methods are well understood. The method for rendering the static image is unimportant. What is important is that an animation style is able to associate image data or image generation instructions with each static value-state of an associated indicator model.

EXAMPLE 1 (continued)

Three animation styles are defined; ZooPictureStyle, KanjiNameStyle, and LabDNAStyle. For the ZooPictureStyle 40 images based on drawings of zoo animals are created. For the KanjiNameStyle the data needed to represent all animal names spelled out using Kanji words is collected. For the LabDNAStyle the data to generate images of the chromosomes of each of the 7 animals specified by the AnimalIndicator plus an empty background image for the no-animal value is collected. It is immaterial that some of the defined animation styles specify more static images than required by an AnimalIndicator indicator model. What matters is that the styles contain a unique image for each of the AnimalIndicator indicator model's static value-states. By defining a larger set of static images than as associated indicator model's value-states, a style may be able to service indicator models with a wider variety of values than the eight initially defined in the present example.

As a dynamated indicator transitions from one value to another, the dynamated indicator's indicator model receives periodic signals from the associated software timing device to output an image of the indicator model's current value-state. The indicator model collaborates with its animation style(s) to output an image which corresponds to the indicator model's current value-state. The effect of these periodic signals is that the indicator model will produce a sequence of images representing a transition through a dynamic value-state.

For each of the indicator model's associated animation styles, the implementor must specify a unique transition for any possible src-dst pair between which an associated indicator model will transition. At a minimum, the animation style must define $N^2$ unique transitions.

The implementor uses the animation style's static images as a basis for the look and behavior of each transition. There are four requirements for each transition sequence: (1) each sequence begins and ends with the static images for the src-dst pair representing the indicator model's current dynamic value-state; (2) each transition sequence defines at least one intermediate image; (3) each of the transition sequence's intermediate images are different from the static images of the src-dst pair; and (4) each transition sequence is different from the transition sequences of the other src-dst pairs. There are an unbounded number of possible transitions (and therefore an unbounded number of resulting visual representations) that can be produced for any src-dst pair.

After the implementor defines the look and behavior of each transition for an animation style, the implementor must define its "means of transition". The means of transition is the method that is used to produce the unique sequence of images for each transition sequence. The means of transition is the chosen implementation of the method of transition of an implementor's animation style. The means of transition can employ any animation technique from complex morphing to simply accessing in-order a sequence of pre-generated image data representing each of the src-dst transitions. However, the actual means of transition employed is immaterial.

As with the animation style's static images, it is immaterial the representation of the transition sequence of images that are produced by the style for a transition. The images can be defined as bitmapped or vector-based data, or computer instructions, or as a hierarchy of sub-structures or other compositional data or instructions.

EXAMPLE 1 (Continued)

For each of the animation styles the implementor defines the means of transition for every src-dst pair of the AnimalIndicator indicator model. The AnimalIndicator indicator model has an alphabet of 8 values so 64 transitions are defined. If desired, for any of the animation style's, the implementer can conclude a plurality of optional means of transition for each src-dst pair. Defining optional means of transition increases the number of transitions beyond N^2.

When an indicator model receives a signal to set one of its properties or otherwise update itself, it collaborates with the selected animation style to manage and effect the change, and to output a new image.

The signal specifies the action necessary to effect the change to the indicator model. When the change is executed, the change may include a current time-index at which the signal occurred. If the signal is a change that is occurring over a time-span, the signal will optionally include the time-span. From the time-span a parametric unit value between 0.0 and 1.0 can be calculated.

Again, the primary property of concern is an indicator model's current value-state. It should also be noted that an indicator model can be signaled to change from one style to another.

After an indicator model's value-state has changed, the indicator model collaborates with the selected animation style to produce an output image. If the indicator model is in a static state, the selected animation style simply outputs an associated static image for the indicator model's value. If the indicator model is in a dynamic state, the selected animation style uses the means of transition to determine the output image.

When the indicator model is in a dynamic state, the animation style uses the src-dst pair and current step value of the indicator model's current value-state as primary parameters in producing the output image. If the implementer has defined the style to have a plurality of transition sequences for a particular src-dst pair, the animation style uses one or more secondary parameters to select the proper transition means. The animation style may also consider other properties of the indicator such as its visibility, size, and color scheme when producing the output image.

An animation style may use any combination of static and dynamic means for producing an image that represents an indicator model's current value-state. A dynamic means would involve a calculation using primary, secondary, and optional parameters as direct data for producing an image in real-time.

A static means is more easily employed by using a lookup-table indexed using the parameters as a key. The data at each entry can be of any useful form; e.g. a pre-generated image, an individual computer method for generating the image, a frame of a compressed movie, etc.

The default method employed by the present embodiment is a method which is a combination of both static and dynamic techniques. The method combines the src-dst pair and any secondary parameters together as a key to index a lookup-table. Contained at each entry of the lookup-table is data specific to the selected transition sequence. This data is used with the current step value of the indicator's value-state to generate the current output image in real-time. The data can be in the form of parameters that are used by the animation style to produce the image, or in the form of individual self contained methods for the production of a sequence of images.

The present embodiment also implements the option for the data to be a pre-generated sequence of stored images. In this basic method, the current step value is used to select appropriate image frames from the transition sequence. This method is also useful in the context of more complex methods in that it can be used to cache transition images so that they do not need to be recalculated each time a particular transition sequence is performed.

The exact type of data at each entry in the table is immaterial to the present embodiment. What is needed is that the data enables the style to produce an image as part of the unique transition specified. Likewise, whether the table is implemented as an array, matrix, dictionary or any data structure known in the art is also immaterial.

Ultimately, the present embodiment allows the implementer the flexibility to define the means of transition for a style however chosen.

Most indicators, in general (i.e. non-dynamated indicators), are visually composed of similar sub-elements. The same is true of most dynamated indicators. The implementer can take advantage of this fact by composing indicator models using sub-components (sub-objects) referred to herein as glyphs. An indicator model can be composed of zero or more glyphs (or glyph objects). The indicator model is the "context" of its glyphs. A glyph only has one "parent" context, i.e., or one indicator model.

For all intents and purposes glyphs are themselves indicators. All behaviors of indicator models apply to glyphs as well. The use of the word glyph is merely for descriptive purposes. All uses of the word glyph can be interpreted as indicator model, sub-indicator, or sub-object.

Like indicator models, glyphs are also models in that they collaborate with an associated style to output their current image. If the implementer does not explicitly associate a glyph with a style, the present embodiment defaults to causing the glyph to adopt the style of its parent indicator model. As indicator models, glyphs can themselves be composed of their own sub-objects.

When an indicator model contains sub-indicators, the output image of the indicator model is a composite of the indicator model's own image and those produced by the indicator model's sub-indicators. Usually if the indicator model has sub-indicators, the indicator model simply composites (combines) its sub-indicators' output images without contributing its own district output image.

An indicator model can use sub-indicators to assist transition between value-states, and to visually compose sections of the images it produces. Each sub-indicator of an indicator model can be associated with its own animation style. As a result, a dynamated indicator can be displayed with multiple styles visible at once.

EXAMPLE 2

Figure 7:
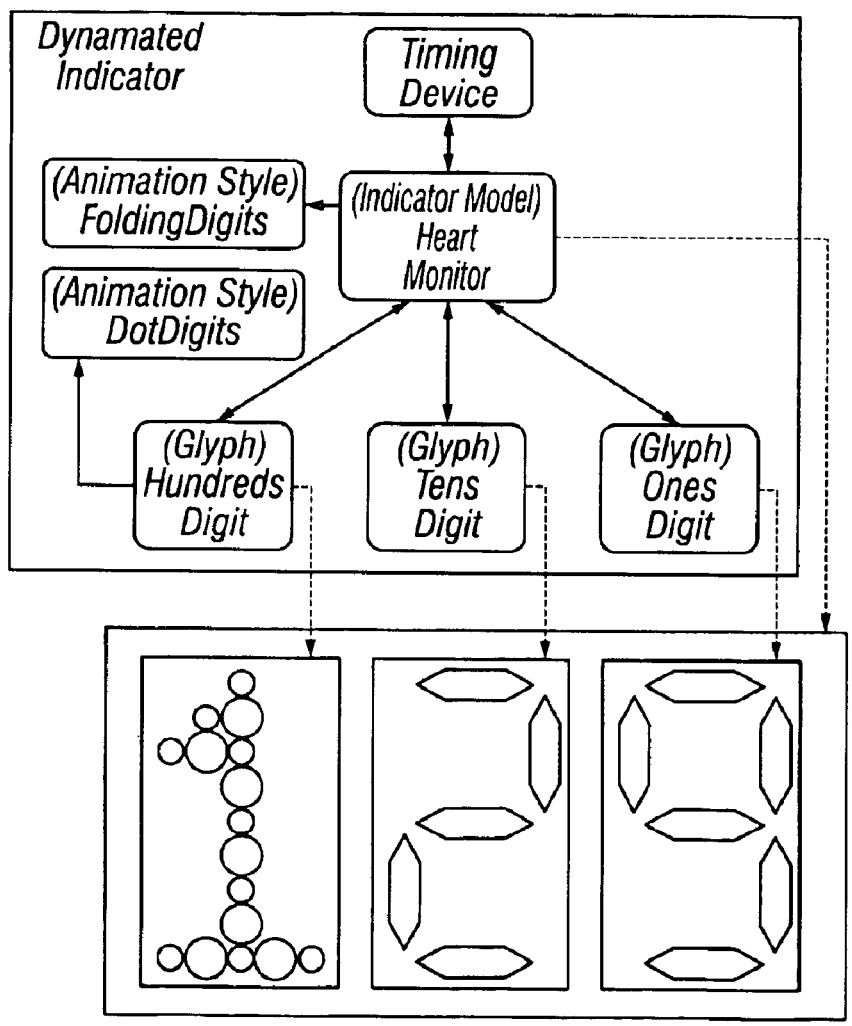
FIG. 7 is a block diagram illustrating object hierarchy in the software engine such as in FIG. 4 for a heart monitor example.

Referring to FIG. 7, a HeartIndicator indicator model is defined with a range of valid values of 0–200. When the value of a heart monitor changes, a display of numbers will be animated to a next heart rate value. Three glyphs are used to compose the HeartIndicator indicator model, one for each digit.

Two animation styles are used in implementing the HeartIndicator heart monitor. The first style, DotDigits, is implemented by the implementor. FOLDINGDIGITS™, is licensed from a provider of a software engine in accordance with the present embodiment. The hundreds digit (glyph) of the indicator model is associated with DotDigits animation style. The indicator model of the heart monitor is associated with the FOLDINGDIGITS™ animation style. Since the ones digit and tens digit are not explicitly associated with an animation style, the ones digit (glyph) and the tens digit (glyph) adopt the FOLDINGDIGITS™ style from their parent context i.e., from their indicator model. The digits at the bottom of FIG. 7 show the image that the dynamated indicator on the heart monitor would show if the dynamated indicator's current value-state was 129. Each dashed rectangle is an area of the output image for which each glyph is responsible, i.e., hundreds, tens and ones. The shaded area above represents actual objects which compose the dynamated indicator.

Each sub-indicator (glyph) can manage its area of the output image. When the glyphs of an indicator model do this, together they implement a complete matrix of unique transitions for their indicator model.

In accordance with the present example both the tens digit (glyph) and ones digit (glyph) must be able to display the values 0–9. The tens digit must also be able to show a blank state. The FOLDINGDIGITS™ animation style implements the complete dynamated matrix of transitions for every digit along with the blank state. As a result, the FOLDINGDIGITS™ animation style can show all 121 and 100 required transitions for either the tens or ones digits respectively. The hundreds digit has a different range as it must only show digits 1 and 2 and a blank state. The means of transition of the DotDigits style is delivered and implemented for all 8 required transitions, i.e., blank–>1, blank–>2, 1–>blank, 1–>1, 1–>2, 2–>1, 2–>2, and 2–>blank. For this glyph there is no blank–>blank transition.

Each of the digits by themselves is a fully dynamated indicator. Together they make the HeartIndicator dynamated indicator. Together they produce a unique transition for each of the possible 40401 (201*201) src-dst pairs of the HeartIndicator dynamated indicator. Each transition of the HeartIndicator dynamated indicator is explicitly dependent upon its source and destination value.

As described above, animation styles are implemented by the implementor to work with specific types of indicator models. To be associated with a particular indicator model an animation style's set of valid values must be a super-set of the indicator's set of valid values. Alternatively, an animation style can be implemented to indirectly support an indicator model by supporting its sub-indicators (glyphs) instead. In the heart monitor example above, the FOLDINGDIGITS™ animation style only supports valid values in the set 0–9 plus the blank state. This is only a subset of the HeartIndicator set of valid values (0–200). However, FOLDINGDIGITS™ is implemented to work with all digit-based counter indicators. It does this by ensuring that any counter indicator with which it is associated defines enough digit sub-indicators (glyphs) to represent all of the valid values in the counter's set.

An animation style can be implemented to add or remove sub-indicators (glyphs) to or from an indicator model, or set the any the sub-indicators of properties as required. When an indicator model attempts to collaborate with an animation style that does not explicitly support the indicator model, the default method employed by the present embodiment is for the animation style to collaborate with the indicator model's sub-indicators (glyphs) instead. An animation style can be implemented to contain a separate set of images and means of transitions for every type of indicator model it supports.

Indicator models, glyphs, and software timing devices are all models. They all can have an associated animation style, and can be built into a hierarchy of associated objects. The software engine can mange a plurality of software timing devices. The software timing devices of the software engine are the root objects of the software engine's hierarchy of model objects. Each software timing device is associated with one or more indicator models. For each of the indicator model's, the software timing device is its parent context. Software timing devices have no explicit parent context.

Likewise, each indicator model can be associated with zero or more sub-indicators (glyphs). For these sub-indicators the referring indicator model is their parent context. Each of these sub-indicators can in-turn be composed of sub-indicators (sub-glyphs). Each indicator can access its associated software timing device by following the path of parent contexts until it has reached the root of the context hierarchy. Alternatively any indicator model can be implemented to use a direct reference to its software timing device.

One of the advantages of organizing the indicator model's sub-indicators in this fashion is that an indicator model can use the hierarchy to adopt properties from its lineage of contexts. If an indicator model (or sub-indicator) does not define a value for one of its properties, it uses the value defined by its parent context as its own. If the parent context also does not define the value, the next context is checked for the value. The search for the value continues to the top of the hierarchy until a model which defines the property is found. If the property is not defined by the software timing device or any indicator mode or sub-indicator in a particular hierarchy, the origin indicator model (or sub-indicator), uses a default value for the property.

Every indicator model (or sub-indicator) directly contains certain properties such as its value-state. Other properties are not contained and rely on the indicator's super-hierarchy to provide a value or default value for the property. See FIG. 8.

Figure 8:
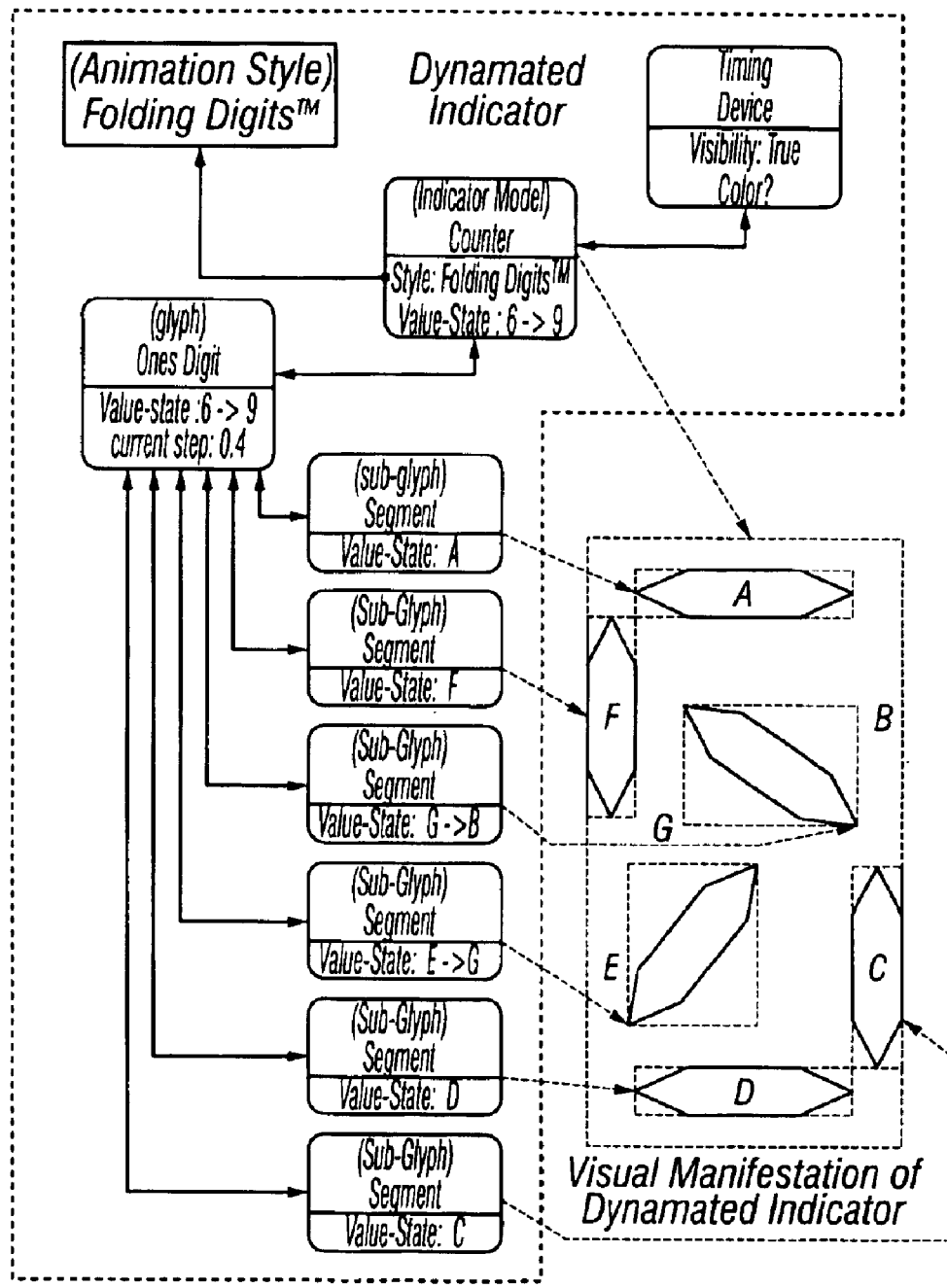
FIG. 8 is a block diagram illustrating object hierarchy in the software engine such as in FIG. 4 for a folding digits example.

FIG. 8 shows the objects which compose an example dynamated indicator for a single digit using the FOLDINGDIGITS™ animation style referenced above. The indicator model is currently showing an image from a transition sequence between a number 6 static value-state and a number 9 static value-state. The indicator model is 40% of the way through its transition sequence. None of the segments (sub-glyphs) specify there own animation style so they adopt the style of their grandparent (or parent) indicator model (or sub-indicator), the counter (or the ones digit).

Likewise, since the sub-glyphs do not specify a value for their own visibility, they adopt the visibility of their great-grandparent, in this timing device. Since none of the indicator models in the hierarchy specifies a value for color, a default value for the color property is used.

There are a wide variety of other properties which the hierarchy can manage beyond the color of the glyphs. Any visual aspect of an indicator can be adjusted using a property e.g. the background, the shape of the any sub-glyph. Like the visual properties, timing properties can also be set and changed at will e.g. the tempo of the transitions, the number of frames per time-index, the time scale (i.e. the number of frames per index). While timing properties are typically stored and managed in a timing device, any indicator model can also contain its own timing properties.

All of the indicator models contain their own value for their respective value-states. In the illustrated case, the first, second, fifth, and sixth sub-glyphs are in a static state, and require no current step value. The third and fourth sub-glyphs are in a dynamic state and require a current step to know how far through their transitions they are. Since the sub-glyphs define no current step of their own, they adopt the current step of their parent, the digit glyph.

When an indicator model's property is set, the new value is stored in the indicator model itself if it directly contains the property. Otherwise the value is stored in a dictionary data structure where the name of the property is used as the key.

This technique can be used by the implementor to reduce the memory requirement of each indicator model (or sub-indicator). Properties which usually rely on a default value, or which are infrequently needed for a particular indicator model (or sub-indicator) can be stored only when required. This technique can be avoided when execution speed is more important that memory consumption.

Setting the property of an indicator model (or sub-indicator) has no effect on its parent context's value for the property. If the indicator model has sub-indicators, their values for the property will now be the indicators model's value if they have no defined value for the property of their own.

Whenever an indicator model's property is set, the indicator model notifies all of its sub-indicators as well as its parent context. Each of these indicator model's then has the opportunity to collaborate with their respective animation styles to adapt to the change which occurred in their parent context or sub-indicator.

Figure 30:
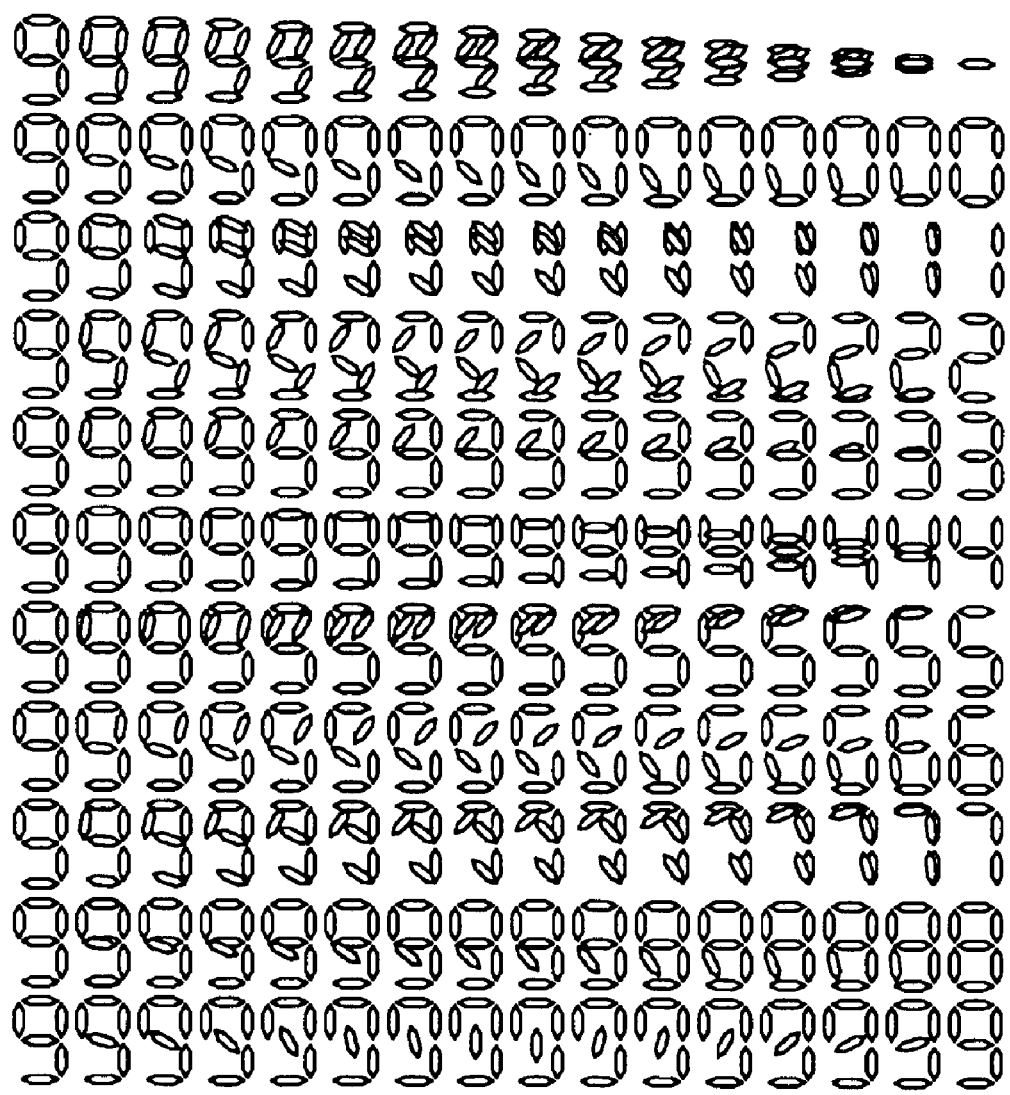
FIG. 30 is a graphical representation of transitions between a "9" value and all values in a value set comprising digits 0 through 9, and "–".

As mentioned earlier, animation styles can be implemented to dynamically add or remove sub-indicators from other indicators. The glyph in FIG. 8 is composed of 6 sub-glyphs. Suppose after the transition from 6–>9 is completed, the glyph receives an input to transition to 8. The glyph would collaborate with its animation style FOLDING-DIGITS™ to effect the transition. The glyph as specified by the style would need seven segments to display the transition 9–>8 (Refer to FIG. 30). Since the glyph currently only has six segment sub-glyphs the style would add another segment to the glyph.

Figure 25:
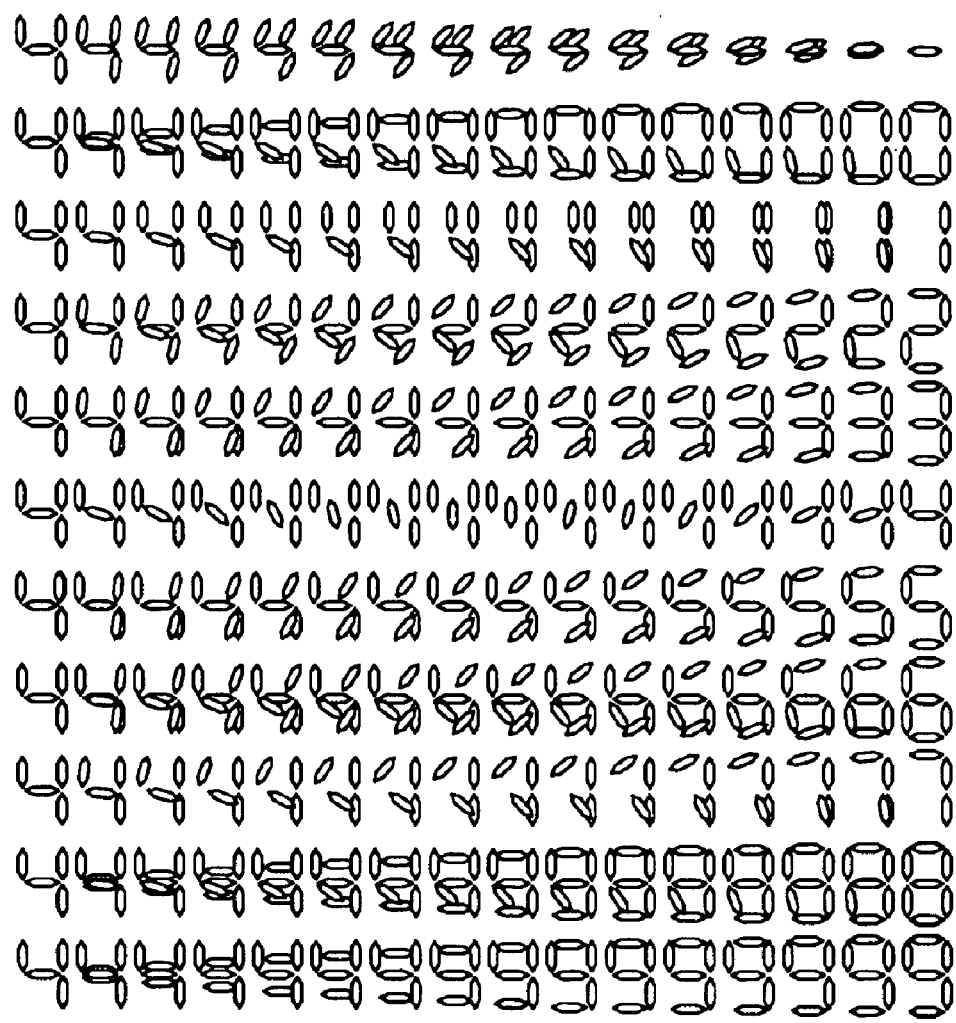
FIG. 25 is a graphical representation of transitions between a "4" value and all values in a value set comprising digits 0 through 9, and "–"
Figure 26:
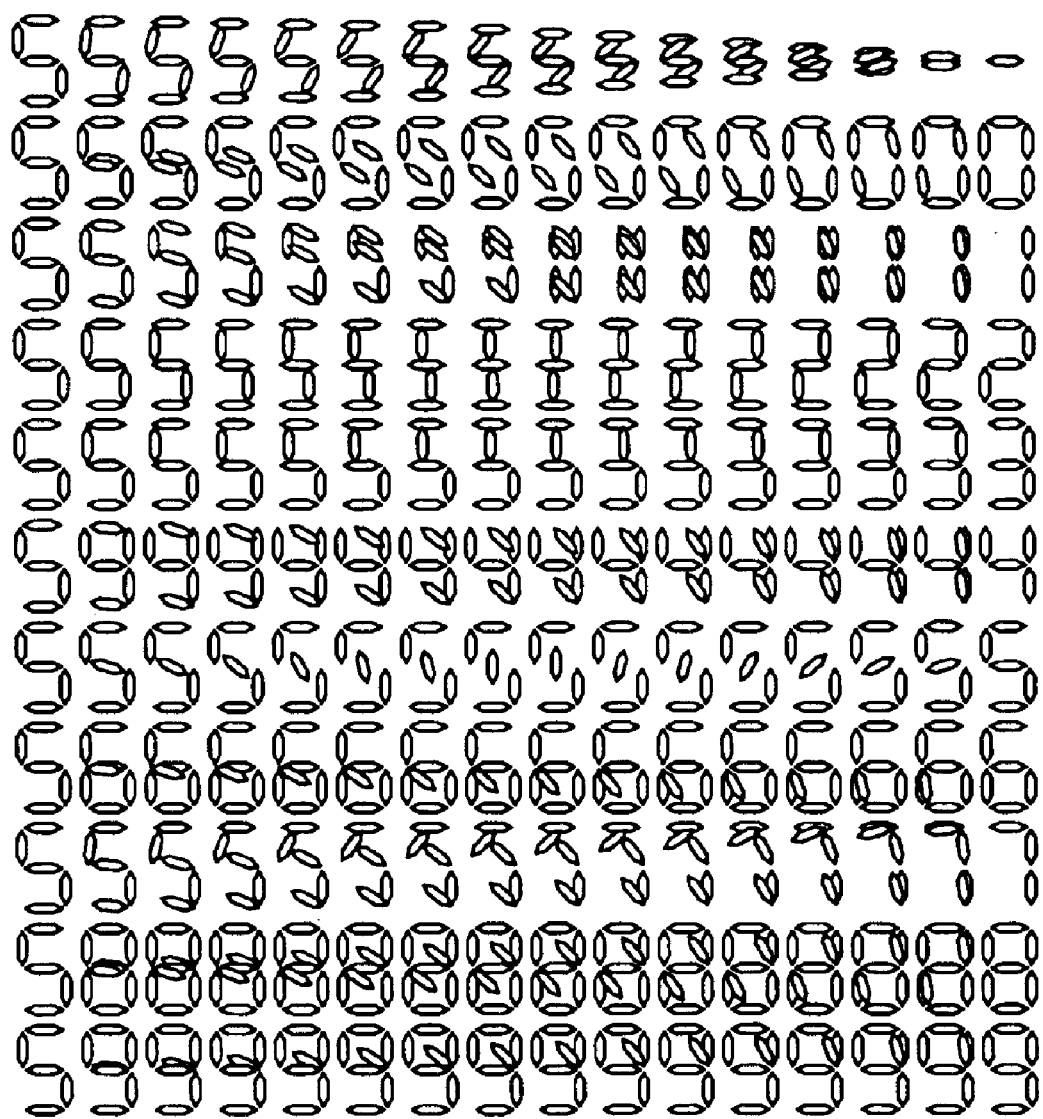
FIG. 26 is a graphical representation of transitions between a "5" value and all values in a value set comprising digits 0 through 9, and "–"
Figure 27:
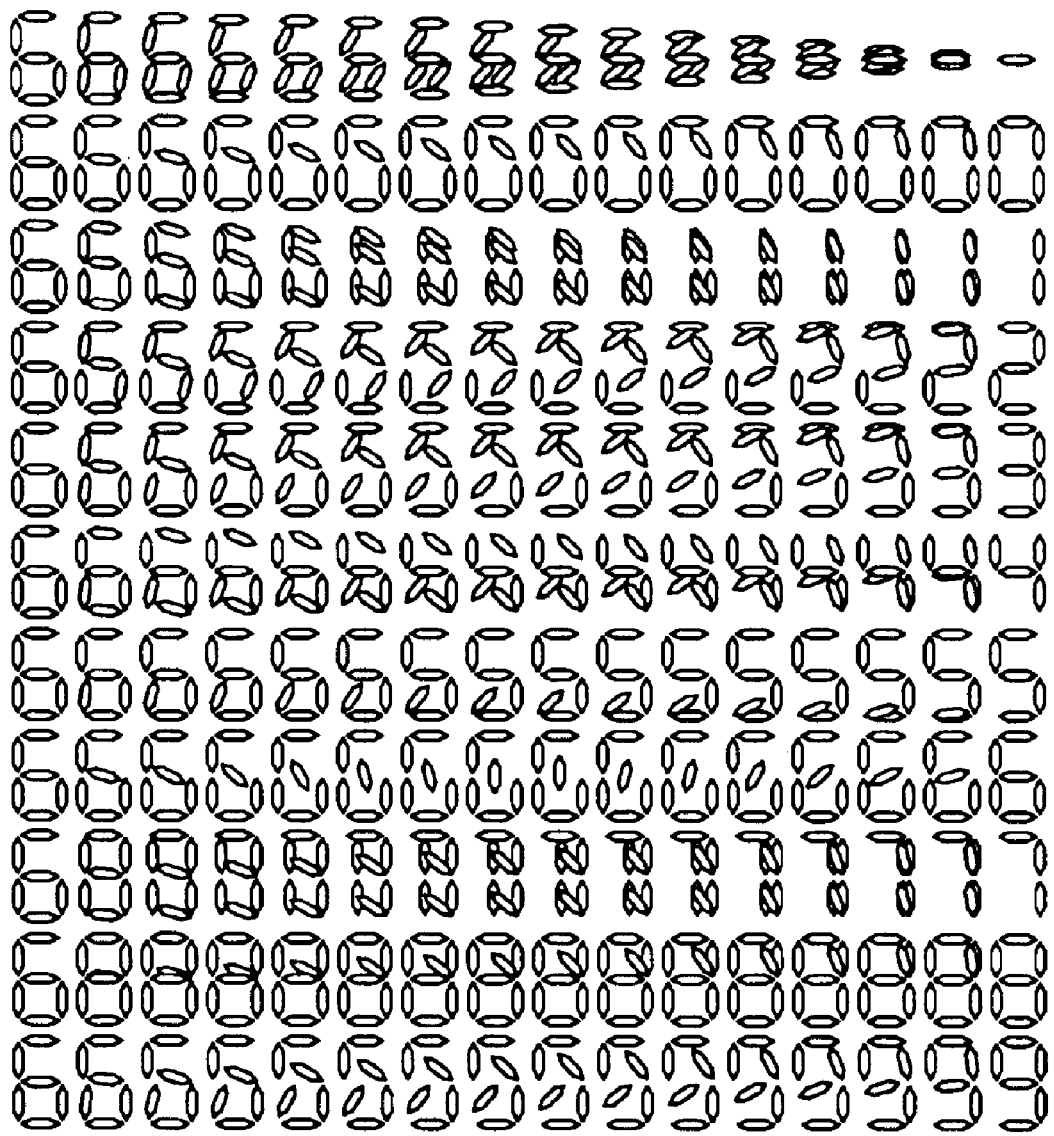
FIG. 27 is a graphical representation of transitions between a "6" value and all values in a value set comprising digits 0 through 9, and "–"
Figure 28:
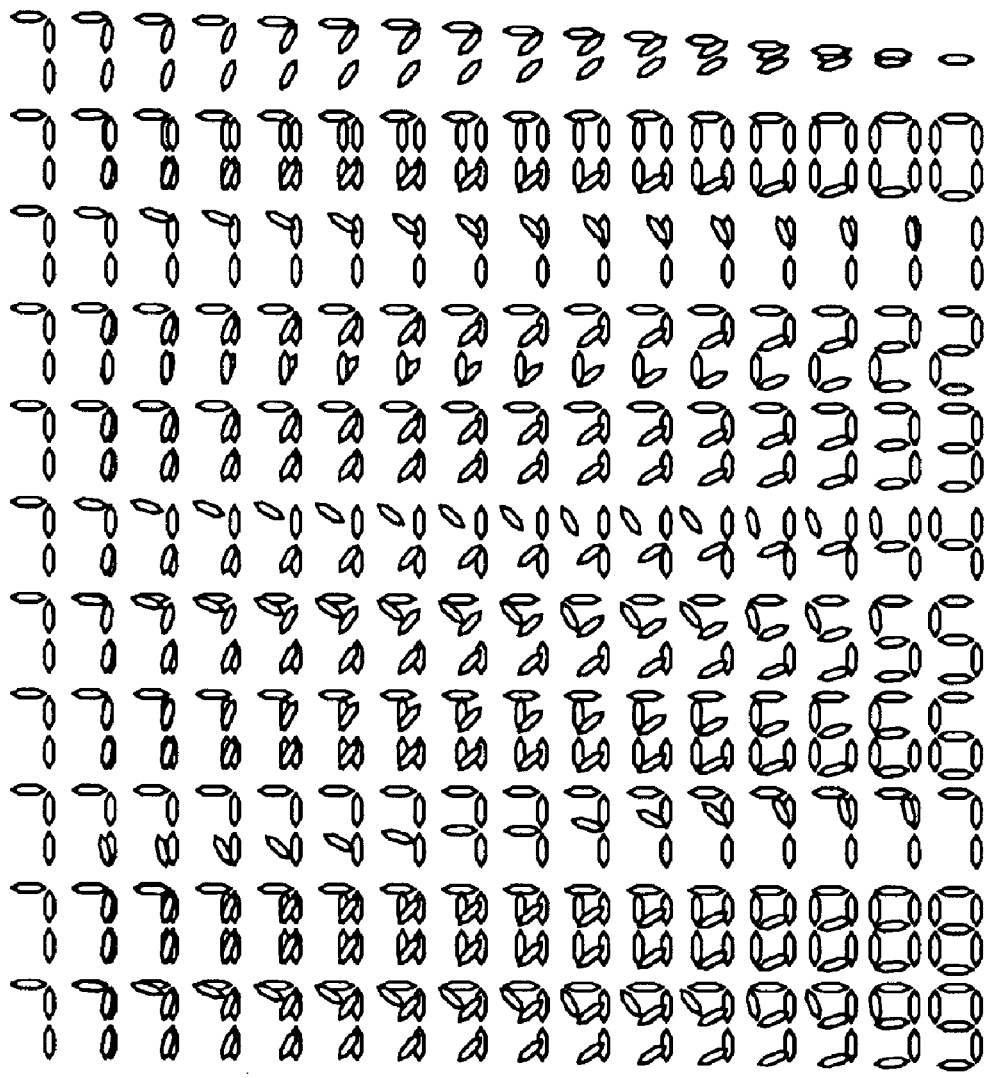
FIG. 28 is a graphical representation of transitions between a "7" value and all values in a value set comprising digits 0 through 9, and "–"
Figure 29:
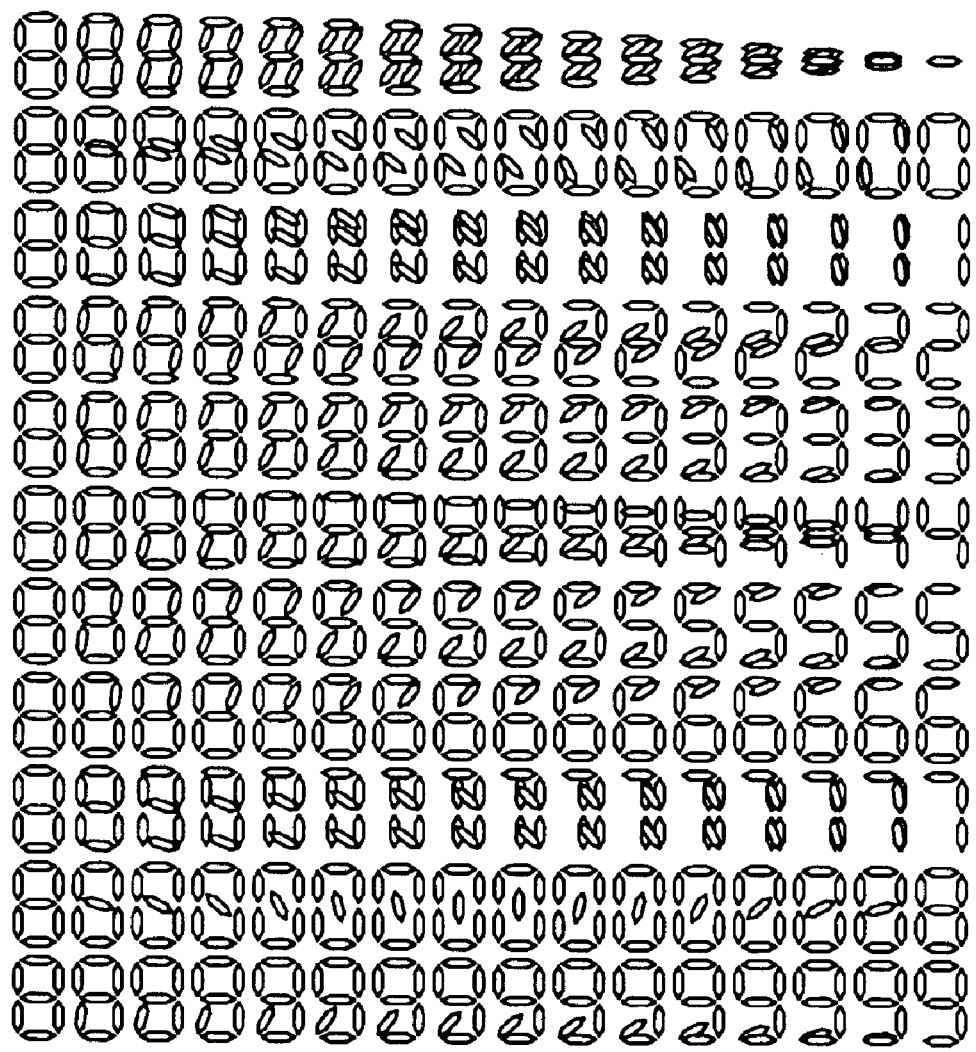
FIG. 29 is a graphical representation of transitions between a "8" value and all values in a value set comprising digits 0 through 9, and "–"

Suppose the glyph was then commanded to transition from 8–>4, and then 4–>3. to perform the transition from 8–>4 seven segments are still required (Refer to FIG. 28), so no sub-glyphs are added or removed. However, when performing the transition from 4–>3, only five segments are required (Refer to FIG. 25). The glyphs' style would cause it to remove two of its sub-glyph.

As described above if an indicator model is to have one of its properties set at a specific time-index or over a time span, its software timing device will send it a signal. It is important to note that even timing properties such as the tempo, and number of frames per time-index, can also be set at a specific time-index or over a time span.

The indicator model uses a timed signal object to record the action that will take place at a time-index or over the time-span. Signals that will occur at a specific time-index are referred to herein as "one-shot" signals, and signals that span a period of time-indexes are referred to herein as repeating signals. The action of a one-shot signal is executed once, and the action of a repeating signal is executed a plurality of times. Repeating actions store the start and stop time-indexes of the time span. For one-shot actions, the start and stop indexes are set to the same value. All timed signals store the target indicator model, the (primary) action upon which will occur, and optionally an id to identify the type of action the timed signal will perform.

The software timing device stores its pending timed signals in a priority queue with priority given to the signal that has the earliest start time-index. If more than one signal has the same start time-index, priority is given to the signal that has the earlier stop time-index.

In addition to repeating a signal's primary (repeating) action, repeating signals can have an optional setup action, and an optional post action. A repeating signal's setup action is executed a single time once the software timing device's current time-index becomes greater than or equal to the repeating signal's start time-index. A setup action is always executed before the primary (repeating) action is executed for the first time. A repeating signal's post action is executed a single time once the software timing device's current time-index becomes greater than the repeating signal's stop time-index. A post action is always executed after the primary (repeating) action is executed for the last time.

Software timing devices receive update signals from the main timing device via the processor to keep track of a master time-index. Ideally, the processor would provide the these signals in a regular fashion exactly at the time required. However, the reality is that in many systems there is a often a great deal of variation between the required update times. Unfortunately, for a variety of reasons well understood in the art, it is often difficult or computationally expensive for a computer system to send update signals with fine timing precision to every component of software that it is executing.

There are a wide variety of ways in that software systems which must deliver signals in a timely manner attempt to address this problem. If the delivery of signals in a timely manner is not handled correctly, the logic of the system could suffer. This ultimately has a negative effect on any animation that the system supports. The present embodiment uses the setup and post actions to ensure that indicator model can always perform specific actions even if the timing is irregular or even very late.

By very late it is meant that a software timing device receives an update signal that it is "expecting" to receive during the transition sequence of an indicator model, after the entire transition sequence is to have been completed, so late in fact that the signal occurs after a second transition sequence was to have begun. In such a case, the engine may skip the transition sequence that did not run during its time slot. Unfortunately, this approach will not work properly if the third transition sequence requires that specific actions take place during the second transition sequence, i.e., transition sequence that was skipped. The use of setup and post actions by the present embodiment ensures that a skipped transition sequence will still perform any required entry and exit actions.

When the implementor defines indicator model's, the implementor defines the actions that will occur when properties specific to the indicator models are to change. The implementor has the option of defining any specific setup and post actions for any changes that occur over a time-span.

Figure 9:
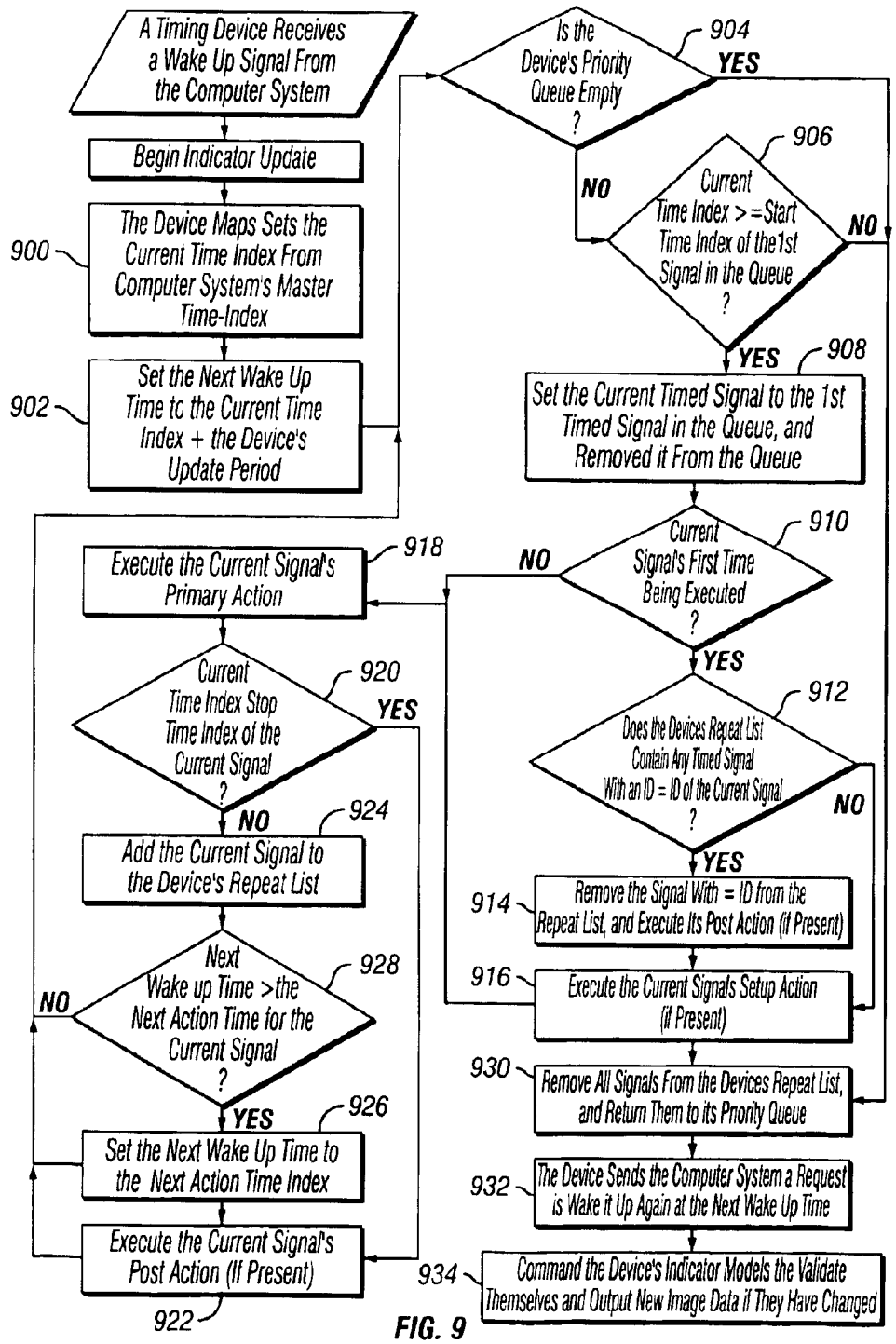
FIG. 9 is a flow chart illustrating steps traversed by the software engine of FIG. 4 in executing a method in accordance with one embodiment.

Referring to FIG. 9, a device begins the update process by mapping (Block 900) the main timing device's master time-index to it own time-scale to calculate the software timing device's current time-index. The software timing device uses a list to hold the signals that will be repeated, and initializes (Block 902) a variable to hold a "next wakeup time-index". The next wakeup time-index is a time-index at which the software timing device should receive an update signal from the processor to begin an update process again.

The software timing device checks (Block 904) a first timed signal in its priority queue. If a current time-index is greater than or equal to the first timed signal's action time-index (Block 906), the first timed signal (or current signal) is removed (Block 908) from the priority queue and will be executed.

If this is the current signal's first time being executed (Block 910), the software timing device checks to see if there is any previously executed signal that is similar to the current signal. If so, the previously executed signal is preempted. The software timing device checks (Block 912) if a repeat list contains any previous signal with a same id as the current signal. If so, the software timing device forces the previous signal to execute (Block 914) its post action, and removes (Block 914) the previous signal from the list. The current signal's setup action is then executed (Block 916), if the current signal has a setup action.

Whether or not this is the current signal's first time being executed, the current signal's primary action is then executed (Block 918).

If the current time-index is greater than the current signal's stop time-index (Block 920), the current signal's post action is executed (Block 922). Otherwise, the current signal is added (Block 924) to the software timing device's repeat list. The current signal then calculates its next action time-index using the current time-index and the current signal's own update interval. The software timing device stores (Block 926) this next action time-index as its next wakeup time-index if it is earlier than the current value of the next wakeup time-index (Block 928).

Whenever a signals' action(s) are executed, the current time-index and the signal itself are provided as optional parameters to the action(s).

The process repeats itself for every timed signal left in the queue. This process is cut short (Block 906) if the current time-index is less than the action time-index of the current first timed signal in the queue.

When the software timing device is done with the queue, the software timing device returns (Block 930) all of the timed signals in the repeat list to its priority queue. The software timing device then requests (Block 932) that the processor send it a wakeup signal at the next wakeup time-index. Finally, the software timing device commands (Block 934) all of its associated indicator models that have been changed (by the previous update process) to validate themselves and then produce new output images.

After any of a software timing device's indicator model's are updated, each indicator model validates itself and produces a new image. By default an indicator validates itself by collaborating with its animation style and then recursively validating the sub-indicators in its sub- hierarchy. Validation involves any tasks that an indicator model must perform in order to adapt to the updates. An indicator model must be in a consistent state before it produces a new output image.

By default, image production uses the same recursive process as validation. Each indicator model collaborates with its animation style to produce image data representing its current value-state. The images of the sub-indicators in an indicator model's hierarchy are composited together to create a single final output image.

The implementor must define the actions necessary to validate and produce output images from the indicator model and styles the implementor implements. The present embodiment allows the implementor the flexibility to change the recursive nature of validation and image output as required.

The present embodiment is currently implemented in the Squeak dialect of the Smalltalk language. However, the present embodiment is by no means limited to this or any other object-oriented programming language. The present embodiment is readily implementable using a wide variety of other programming systems.

Figure 10:
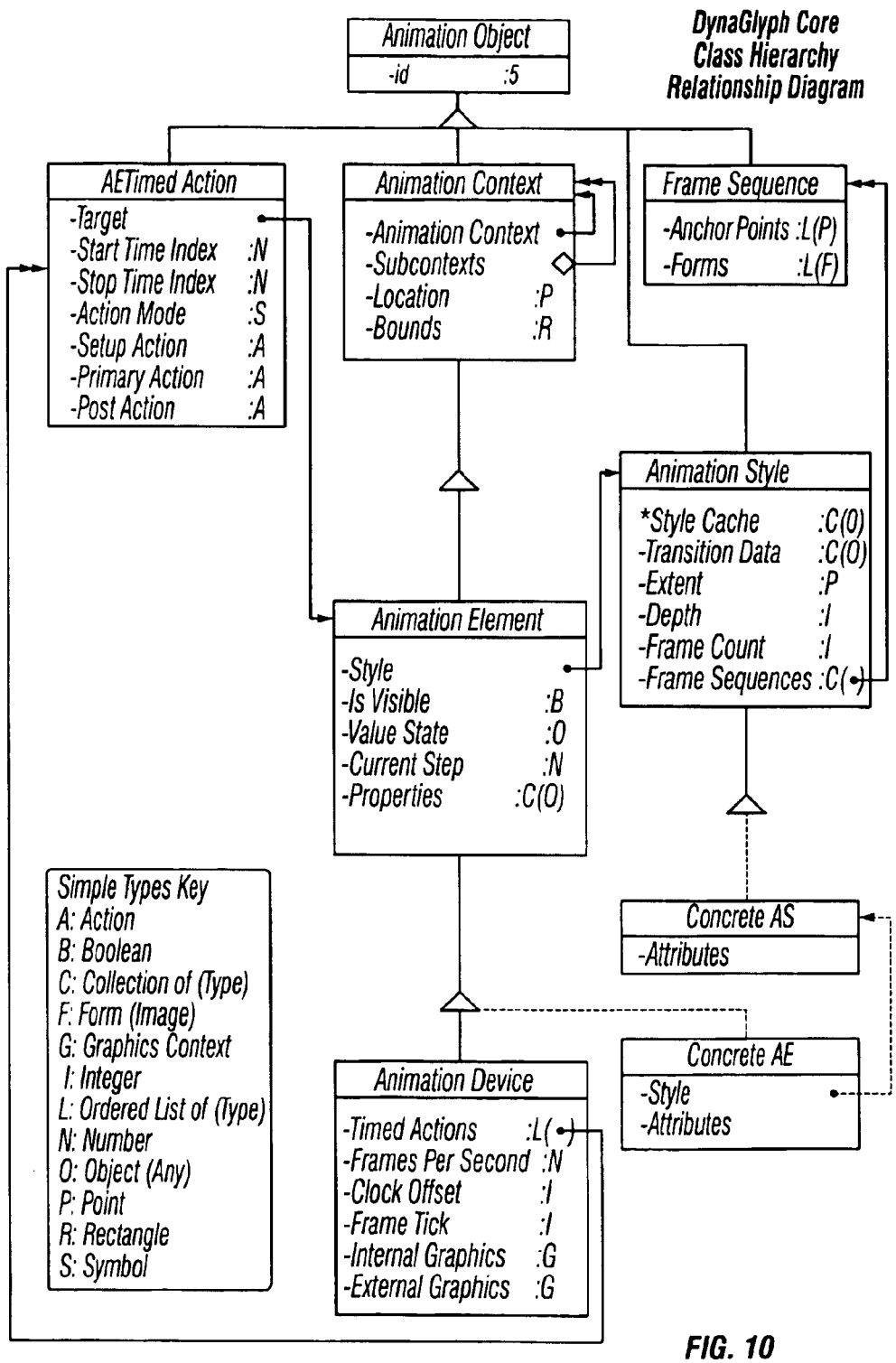
FIG. 10 is a block diagram illustrating a class hierarchy in the software engine such as in FIG. 4.

Referring to FIG. 10, the class hierarchy of the DynaGlyph software framework is shown in a modified UML (Unified Modeling Language) format to abstract the core object classes of the present embodiment. Each block in FIG. 10 represents a class. The name of the class and defined attributes of each instance of the class are shown above and below a dividing line, respectively. The name of the class is italicized if the class is abstract. Superclasses are connected to their subclasses via triangular inheritance markers. Dashed lines connect classes that are not strictly part of the framework, and which must be implemented by the implementor.

Attributes are listed with a dash or a star preceding them. When an attribute is preceded by a dash, the attribute is an instance variable, i.e., each instance of the class may have its own value for that attribute. When preceded by a star, the attribute is a class variable i.e., the attribute is shared by all instances of the class. Following each attribute is an indication of the type of the attribute. The type is either a basic type, or a reference to one of the types (classes) defined by a DynaGlyph framework. Single-headed arrows, indicate that instances of the referencing class refer to a single instance of the referent class. Two-headed arrows indicate that one or more instances are referenced. When the root of an arrow is a diamond, it signifies an aggregate relationship.

Only the most critical attributes of each class are shown in the diagram. Instances of concrete AnimationElement and AnimationStyle classes may often need to keep track of other attributes such as color, color depth, background image, etc. While these attributes are common, they are not explicitly required by the DynaGlyph framework. This is an implementation issue that is up the implementor, and is not directly material to the nature of the present embodiment.

The following classes are standard in most object-oriented systems, and are well known or easily accessible to those versed in the art.

Action—A named or anonymous function. In Smalltalk, an action is an object that conforms to action protocols. Message selectors (symbols), messages, message sends, and blocks all conform to this protocol.

Boolean—Either true or false.

Collection{Type}—A collection of objects of the specified type. If the type is Object, then any type of object is acceptable. In the context of the class hierarchy, collection usually specifies a dictionary where each of the members of the collection is referenced by a Symbol key.

Form—An image implemented as a bitmap/pixmap of an arbitrary depth. The form also holds a rectangle which represents the origin and bounding box of the image.

GraphicsContext—A GraphicsContext handles, and keeps track of all the BitBLT (bit block transfer) rendering between Forms. It keeps track of the current drawing state. Its drawing states are stackable.

Integer—An integer number.

Ordered List (Type}—An ordered collection of objects of the specified type.

Number—An integer, fixed point, floating point, or fractional number.

Object—Any object within the object-oriented hierarchy.

Point—A 2D Cartesian point consisting of an x and y number. Points use the standard computer graphics axis where x increases positively to the right, and y positively downward.

Rectangle—A 2D Cartesian rectangle defined by two points; the top-left, and the bottom-right.

Symbol—A unique identifier. (Usually a unique string).

Color and UndefinedObject are two other important basic types not explicitly referenced in the class hierarchy diagram. A color is usually an RGB, or gray scale value for use in a form. Smalltalk use nil as its Undefined object. While "nil" is not defined in every high-level programming language, the concept is implemented (or implementable) in all.

DynaGlyph Classes (Types)

AnimationObject—AnimationObject is the abstract superclass of all the classes in the DynaGlyph object hierarchy. Like all of the basic types, it descends from the Object class. AnimationObject is the repository for generic utility methods (functions) used in the framework.

Attributes id—references the object's unique id.

AnimationContext—AnimationContext is an abstract class which descends from AnimationObject. AnimationContext manages its instances' subelement containment hierarchy, and the physical layout of elements within each other. Each AnimationContext instance uses its own local coordinate system.

Attributes

AnimationContext—references the context's containing AnimationContext. If the object has no containing context or is the top context, AnimationContext references the context itself.

subcontexts—references a collection of zero or more AnimationContexts (AnimationElements) which are contained within the context.

location—references the point that is the distance of the object's origin from the origin of the containing context's coordinate system.

bounds—references the context's bounding box as measured from the origin of its own coordinate system.

AnimationElement—AnimationElement is an abstract class which descends from AnimationContext. AnimationElement handles all of the common attribute information of an AnimationElement object. AnimationElement also handles the basic updating, validating, and displaying of elements.

Together AnimationContext and AnimationElement are the embodiment of the indicator model objects described earlier. These two classes can be combined into a single class, however they were divide into two separate classes to separately abstract the structural and functional aspects of an indicator model.

Attributes style—references an appropriate concrete AnimationStyle object.

isVisible—references the boolean value of the element's visibility. isVisible determines whether or not it should be displayed.

valueState—the principle aspect of the element's current (transition) state. The interpretation of this attribute is defined by each of the concrete descendent classes of AnimationElement.

currentStep—a number representing the progress of the of current state's transition from start to finish. currentStep can (but is not required to) be represented by a unit value.

properties—references a collection of attributes. Any attributes for which the element does not have a specific instance variable (slot) can be held in this dictionary. (The implementor can, at her option, add specific slots to any of the defined classes.)

AnimationDevice—AnimationDevice is a concrete class which descends from AnimationElement. An instance of AnimationDevice is required as the root of an AnimationElement instance tree in order to run an animation. AnimationDevice is responsible for the animation timing of AnimationElement instances.

AnimationDevice is the embodiment of the timing device objects as described earlier.

Attributes timedActions—references a priority queue or sorted list of AETimedActions. The list is sorted in ascending ordered, prioritized by the AETimedActions' startTimeIndex, their stopTimeIndex, and if necessary their id.

framesPerSecond—references the frequency of update of the device.

clockOffset—references the offset of the device from the computer system's master time-index. It is used to convert the master time-index into its own time-scale.

frameTick—references the desired tick for the current animation frame. frameTick is used with the clockOffset and the computer system's current tick to calculate the next frameTick time. (A tick is the atomic concrete time unit supported by the implementation hardware apparatus.)

internalGraphics—references the internal GraphicsContext which the device uses for double buffered drawing. This attribute is optional.

externalGraphics—references the GraphicsContext which displays the final composite drawing of the device's sub-elements.

AETimedAction—AETimedAction is a concrete class which descends from AnimationObject. Its instances hold all of the information required to perform delayed actions, or actions (transitions) that occur over a span of time, on an AnimationElement instance.

AETimedAction is the embodiment of the timed signal objects as described earlier.

Attributes target—references the target AnimationElement of the timed action startTimeIndex—references the start time index of the timed action.

stopTimeIndex—references the stop time index of the timed action.

actionMode—references the current state of the timed action (e.g. waiting to start, executing the main action, about to finish).

setupAction—references the setup action that is be performed the moment before the primary action is to begin. When the setup action is performed, the target object has the opportunity to override any other of the target's timed actions (e.g. any other actions with the same id, with time spans that overlap the action).

primaryAction—references the main action that will be repeated over the time span of the timed action.

postAction—references the action that will occur immediate after the time span of the primary action has been completed.

FrameSequence—FrameSequence is a concrete class which descends from AnimationObject. FrameSequence instances are used by AnimationStyle objects to cache a sequence of pre-generated images and their path of motion. FrameSequence instances contain one or more images, and one or more location points. If an instance references only one image, this same image is used in each frame at each of the instance's locations in turn. If an instance references only one point, each of the instance's images is drawn at the same anchor point in each of the frames. If an instance references a plurality of images and points, each image is positioned in turn at each of the anchor points.

Attributes anchorPoints—references an ordered collection of points.
forms—references an ordered collection of forms.

AnimationStyle—AnimationStyle is an abstract class which descends from AnimationObject. AnimationStyles handle the management of the display, and transition state of AnimationElements. When an animation style is attached to an AnimationElement instance, the animation style may add or remove subelements, or substyles to the instance, or its subelements.

Every concrete AnimationStyle has a database of transition data. By default, the keys to the database are each of the specific transitions that the style supports. The nature of the data stored at each key is defined by each concrete descendent class of AnimationStyle.

Instances of an AnimationStyle caches the image data for its transitions using FrameSequences. If the type, bounds extent, color depth, or frame count of a referring AnimationElement instance changes, the AnimationStyle instance's cache may need to be flushed. Generating the FrameSequences for an AnimationStyle instance can be computational expensive. To prevent the unnecessary rebuilding of this data, each concrete style class may cache previously built instances of itself.

AnimationStyle is the embodiment of the animation style objects as described earlier.

Attributes styleCache—is a class variable which references a collection that caches previously built instances of this AnimationStyle.

transitionData—references a collection of the transition data required for each transition defined by the specific concrete AnimationStyle. (Some AnimationStyle subclasses may make this attribute a class variable.)

extent—references a point that represents the size of this instance of the style.

depth—references the bits of (color) depth at which this instance of the style will be displayed.

frameCount—references the number of frames used to fully step through a state transition using this instance of the style.

frameSequences—references a database of the FrameSequences require to implement this AnimationStyle at this extent, depth, and frame count.

ConcreteAE and ConcreteAS Classes

ConcreteAE and ConcreteAS, represent implementor defined subclasses of AnimationElement and AnimationStyle respectively. In order to make use of the DynaGlyph software framework, the implementor must define at least one concrete subclass of both AnimationElement and AnimationStyle. Concrete AnimationStyles and AnimationElements may define any additional attributes required by their instances. Concrete elements will only reference concrete AnimationStyle objects. Each concrete AnimationElement class will correspond to an indicator models, or glyphs that the implementor defines.

alphaNumericon Software Framework Summary alphaNumericon is a software framework for dynamating any glyph, in an alphabet of glyphs, into any other glyph. The framework is used as a utility package in conjunction with application software.

AlphaNumericon enables the application software to make use of dynamation in the display of characters, numbers, and other glyphs.

Glyphs are represented by concrete AnimationElements. An AnimationElement can be recursively composed of other concrete AnimationElements. There is no maximum number of AnimationElements that can be used to represent a set of glyphs. In other words, the framework imposes no arbitrary maximum number of glyphs that can be represented and displayed at once. The only limit is the number of objects that can be represented in working memory.

In order to animate a tree of AnimationElement instances, the root must be an AnimationDevice instance. The device contains all of the state information and behavior to initiate and coordinate its subtree of elements.

During the course of animating a software timing device and its subelements, the application program will adjust the state and attributes of the elements that represent the glyph, to achieve the desired animation behavior. The adjustments can be made to the elements immediately, at a set time index, or over the span of one time index to another.

Within the framework, time is represented in terms of time indices instead of using concrete time units (e.g. seconds). This enables the time scale, and pacing of alphaNumericon animations to be easily adjusted. A time index can represent any unit of time; e.g. minutes, seconds, fractions of a seconds, etc.

Referring to FIGS. 11 through 19, several types of animation behaviors are illustrated. All of the illustrated behaviors are implemented in software components that are used as a black box component by application software to display an indicator representing some value. The application software and the software component are executed on a processor or other computer-based device. The processor makes use of a display device onto which output images created by the software component is ultimately shown.

In FIGS. 11 through 19, a central element is a box representing the software component. On the left side of the box are one or more inputs to the software component. The software component uses the input(s) to determine what image or sequence of images is to be produced as an image output. The image output is always an image representing the current value-state of the indicator.

Within the box are two rectangular ovals. The top oval represents a source value set, and the bottom oval a destination value set. These values sets represent possible the start values of the indicator, and possible the end values of the indicator. Within each oval are circles, each of which represent valid values for the indicator. These values are known as states V1 through Vn, where n is the number of unique values in the value set. Both ovals represent the same set of valid values. For each of the valid values of the indicator there is a unique image that represents that value.

To the left of each of the ovals representing the source value set and destination value set is a diamond. The top diamond represents start time of the transition from the source value. The bottom diamond represents an end time of a transition to the destination value. The wide-headed arrow from the top diamond to the bottom diamond is there to draw attention to the direction of the passage of time within the software component.

In FIGS. 11 through 19, there are one or more thick-lined arrows from the source value set to the destination value set. Each of these arrows represents a unique means of transitioning from a source value to a destination value. The actual means of transition is immaterial to the indicators. Any conventional means of animation can be used to effect the transition from one value to another.

Each of the arrows can be thought of as a pipe. What flows through the pipes is not important. The presence of the pipes, and their connection layout is what is important.

The current state of an indicator is inextricably related to the value it is to represent. If the indicator is in a static state, its current state is defined by its value. If the indicator is in the process of performing an animated transition from a source value to destination value, the indicator's current state is defined by the transition's source and destination values. Thus an indicator's state is known as its value-state.

Figure 11:
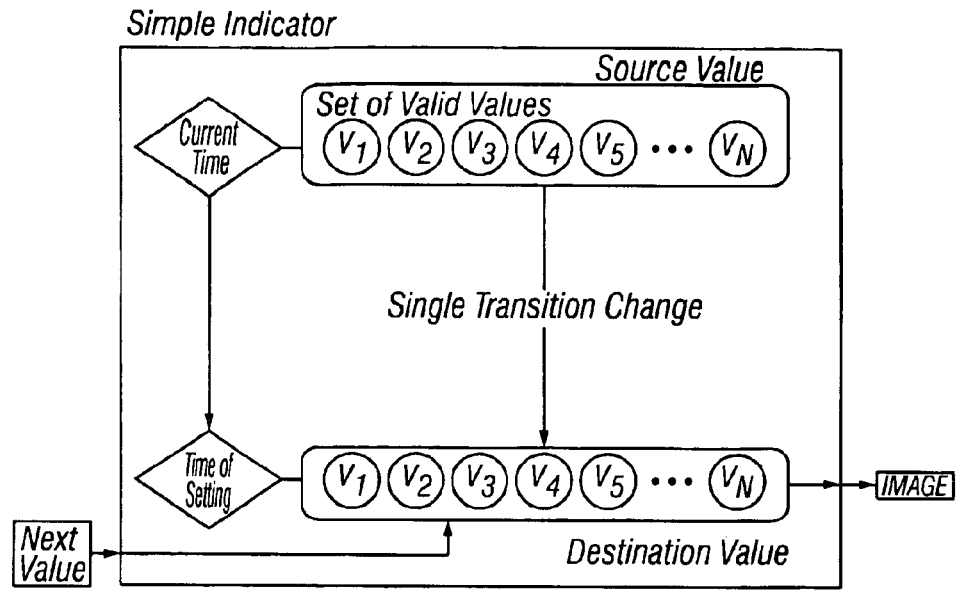
FIG. 11 is a diagrammatic representation of a simple indicator.

Referring to FIG. 11, a simple indicator is shown. A simple indicator is any basic non-animated indicator. This figure can represent almost any electronic indicator found in simple products. Examples include most non-animated indicators found on a computer screen, VCR, television on-screen display, digital clock, character display, etc. For an alphanumeric pager, the valid set includes any possible combination of numbers and letters which can be shown at once on its display. For an airport gate indicator, the set of valid values includes all letter and number combinations of the gates at the airport in which the indicator is located.

The source value is the indicator's current value-state, i.e. the currently displayed static value. When the software component receives an input for the next value, the software component sets its value-state to the new value, and outputs the corresponding image for the new value. The new image is output at the time of setting of the value. The only restriction on the next value is that it must be included in the indicator's set of valid values.

In FIG. 11, there is only one pipe from the set of source values to the set of destination values because there is only a single means of performing a transition. Since the transition is instantaneous (or static) the indicator is simply set to the next value-state, and a single new image is output.

Note: If a simple indicator changes its value and produces images fast enough, it may appear to be animating. Strictly speaking however, this is not actual animation. Animation for indicators is defined as the output of images that represent intermediate states between the source and destination value-states. These intermediate images are different from the unique static source and destination images. Since the simple indicator makes its transitions in only one step using no intermediate images, it is not animated.

Though not shown, all of the indicators in FIGS. 11 through 19 can default to the behavior of a simple indicator—performing an immediate static transition from any valid value to any other valid value.

Figure 12:
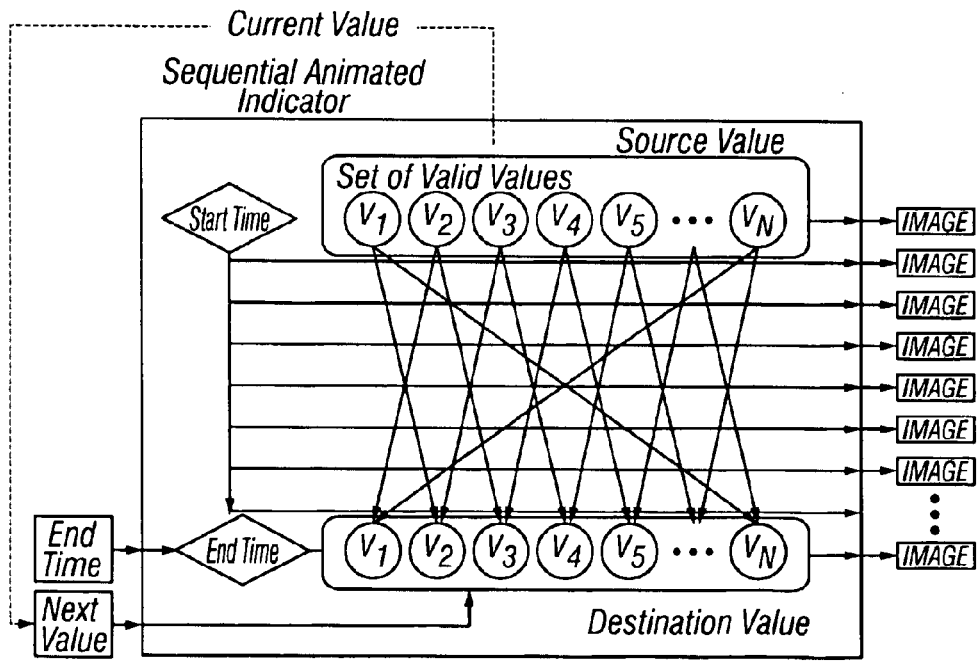
FIG. 12 is a diagrammatic representation of a sequential animated indicator.

Referring next to FIG. 12, a sequential animated indicator is shown. The sequential animated indicator is animated in that it produces a plurality of unique intermediate images as it transitions from a static source value to a static destination value. The indicator is sequential in that it can only transition from one valid value to the next (or previous) valid value, not from any valid value to any other valid value.

When the application software initiates a change in the indicator, the application software sends the software component two canonical input values; the next value (which can be either the value before the present value, or the value after the present value), and the time at which the animated transition will complete. The inputs are canonical in that other explicit or implicit inputs could be defined for the indicator. However, these other inputs could ultimately be broken down into the effective canonical inputs.

The valid input to the indicator is limited by the indicator's current value-state. The next value must be a sequentially neighboring value to its current value. This dependency is noted by the dashed arrow coming from the source value to the next value input. The end time must occur after the start time. At the start time the source value is the indicator's current value. The destination value is the next value of the indicator.

In FIG. 12, between the start and end times, there is a plurality of horizontal arrows. These arrows are used to represent the passage of time. Each of these arrows points to an output. Together, these outputs provide a plurality of images used to represent the indicator's value-states as the transition progresses from the source value to the destination value. The images are used as the frames of the animated transition.

Unlike in FIG. 11, there are multiple pipe arrows. Each arrow represents a unique means of transitioning from a specific source value to a specific destination value. For example, V2 can transition to V1 or V3 using a unique animated transition. In sequential animated indicators, each value can only perform an animated transition to its two neighboring values. The total number of valid and unique transition means is equal to 2*N.

Figure 14:
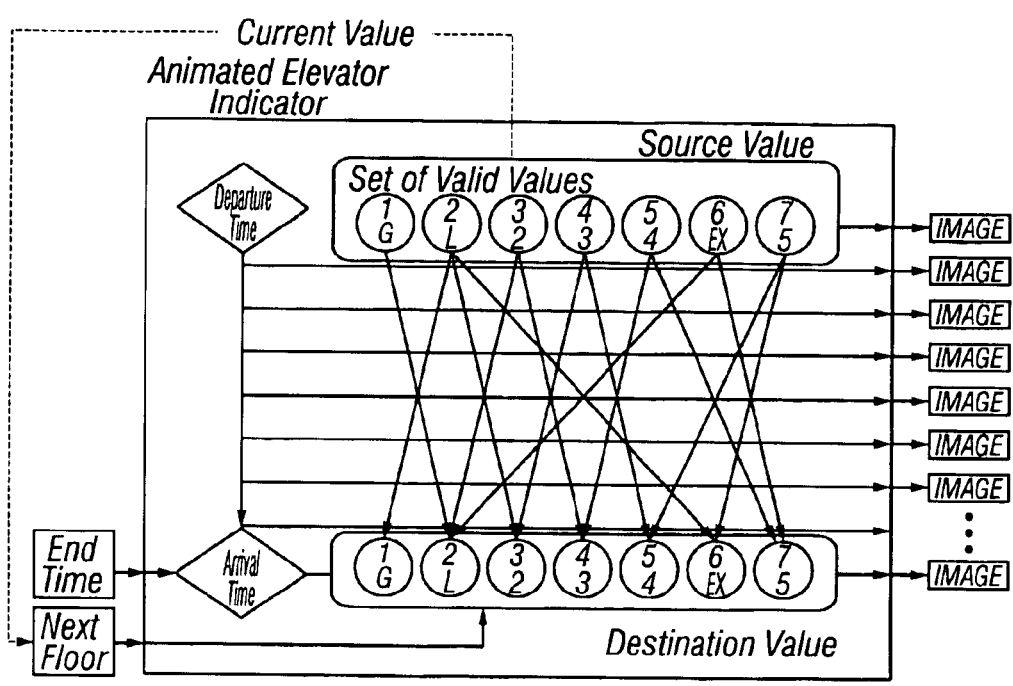
FIG. 14 is a diagrammatic representation of a animated elevator indicator.

Referring to FIG. 14, an animated elevator indicator is an example of a mostly sequential indicator. The indicator has a few extra transitions (beyond the standard) from some values, and a few less for some others. However in the aggregate, it is mostly sequential in that the general pattern of valid transitions is sequential, and the total number of transitions is approximately 2*N.

When the application software controlling the elevator needs the indicator to change, it sends the software component two canonical input values; the next floor, and the end time at which the animated transition will complete itself. The end time is based on the amount of time it takes the elevator to travel from one floor to another. Like other sequential animated indicators, the next valid input value is dependent upon the indicator's current value-state.

Figure 13:
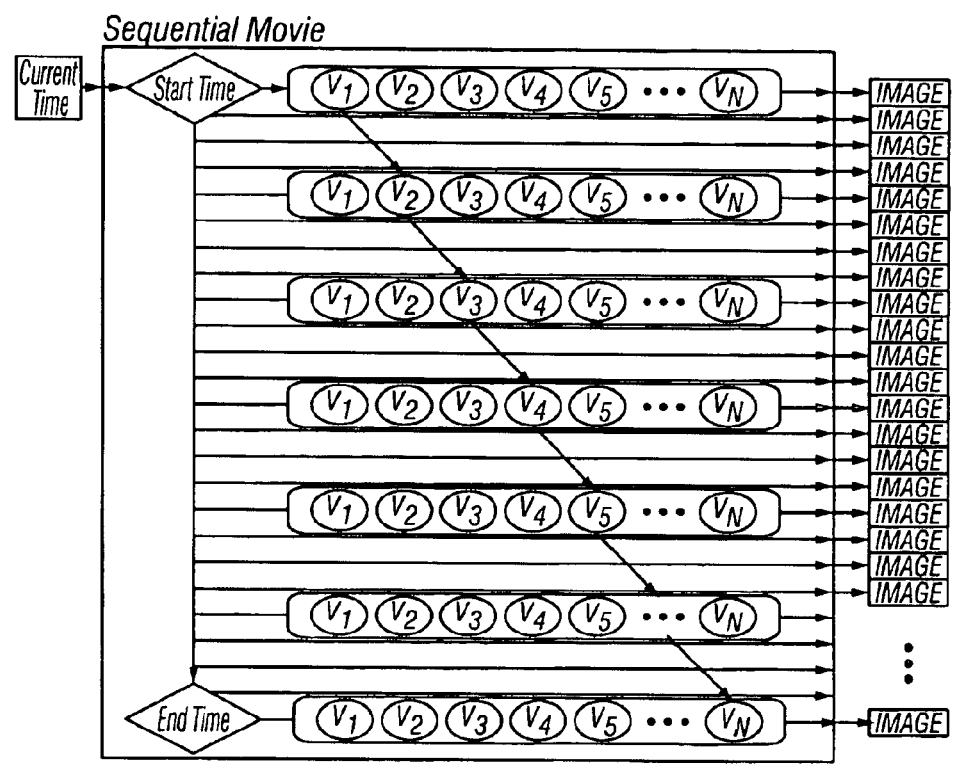
FIG. 13 is a diagrammatic representation of a sequential movie indicator.

In FIG. 13, a sequential movie indicator is an indicator in which the values transition from one valid value to another in an animated fashion. Like the sequential animated indicators, this indicator outputs a plurality of images as it transitions in-order from one value to another. However, this indicator differs from sequential animated indicators in that the values which will be animated are predetermined. At no point is the software component able to accept an input from the application software which will enable it to transition to a particular value. The only input the software component can accept is one commanding it to begin its animation over a predefined sequence of values.

The application software provides the software component an input which begins the output of images. The application software receives these images, and displays them as the frames of a movie.

FIG. 6: Common Animated Indicator

Figure 15:
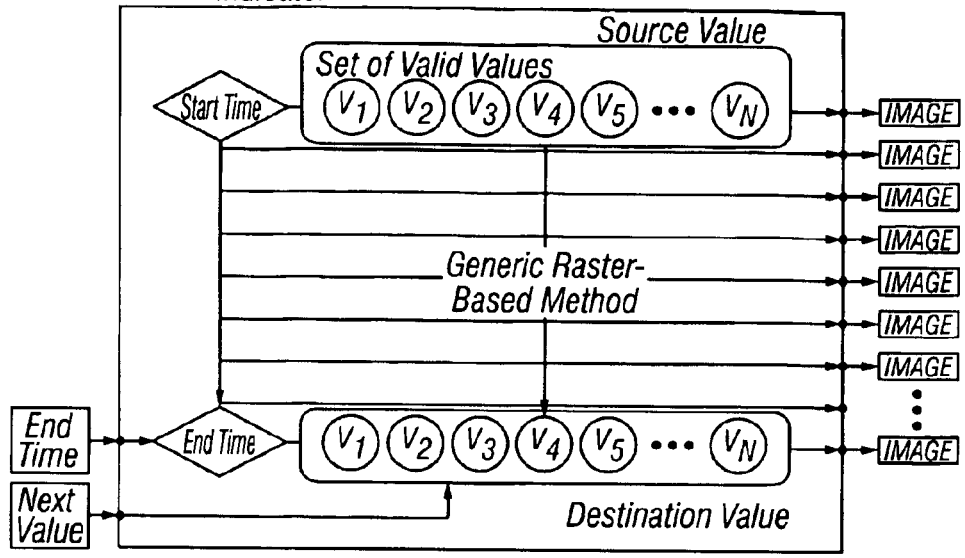
FIG. 15 is a diagrammatic representation of a common animated indicator.

Referring to FIG. 15, a common animated indicator gets its name from the fact that it uses a single common transition method to animate from any valid source value to any valid destination value. (In fact, the source value set and the destination value set can be infinite, as the transition from the source value to the destination value is not a function of the source value or the destination value.) Unlike sequential animated indicators, the common indicator has no restrictions on the next value input, except that the next value must be included in the set of valid values.

The software component is able to perform an animated transition from any value to any other value using a generic raster-based transition method. This technique is the least expensive way to allow general purpose animated transitions.

The software component has only one pipe arrow from the set of source values to the set of destination values because there is only one means of producing transitions. There is no guarantee that a transition from any value to another will have a unique appearance.

This indicator is unlike the sequential animated indicator in that the means of transition is not dependent upon the source value or the destination value. Raster techniques, such as the common animated indicator, directly uses the static source image and the static destination image to generate the intermediate images for the transitions. The static source image and the static stop image could be anything. Raster techniques do not make any direct use at all of the source value or destination value.

Figure 16:
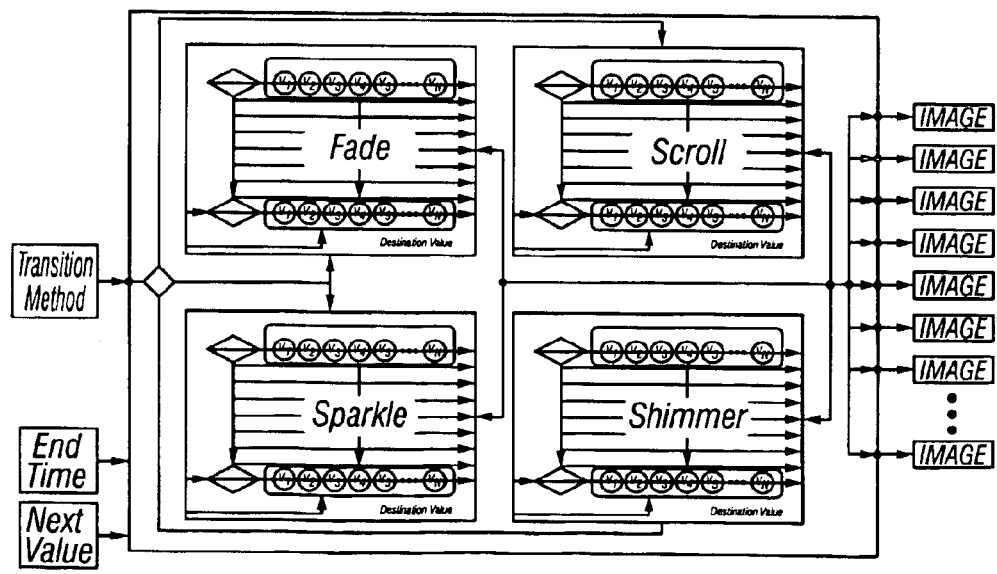
FIG. 16 is a diagrammatic representation of a multimode animated indicator.

Referring to FIG. 16, a multimode common animated indicator is shown. Though a common indicator uses a single generic raster-based means to transition from any source value to any destination value, the same software component can make use of a plurality of generic raster-based techniques. Most animated electronic information displays provide a variety of raster-based "effects" to create animated transitions between display values.

The software component of FIG. 16 has an additional input which specifies which raster technique should be used.

Figure 17:
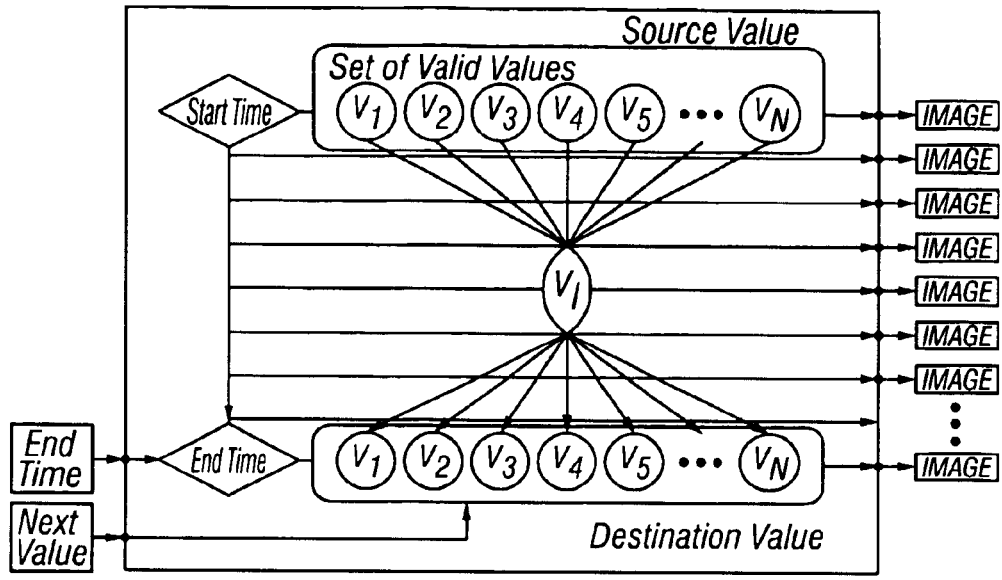
FIG. 17 is a diagrammatic representation of an intermediate value animated indicator.

Referring to FIG. 17, an intermediate state animated indicator is similar to a common animated indicator in that it can perform an animated transition from any valid source value to any valid destination value. They are similar to sequential animated indicators in that they use 2*N pipes.

All transitions from one value to another are composed of two separate subtransitions. At some point in the process of outputting images, every transition will reach a common intermediate value-state that is shared with every other transition. When at this shared intermediate value-state, the engine will output the same common image.

While allowing greater expressiveness than common animated indicators, no transition of values is unique in its entirely as with sequential animated indicators.

Figure 18:
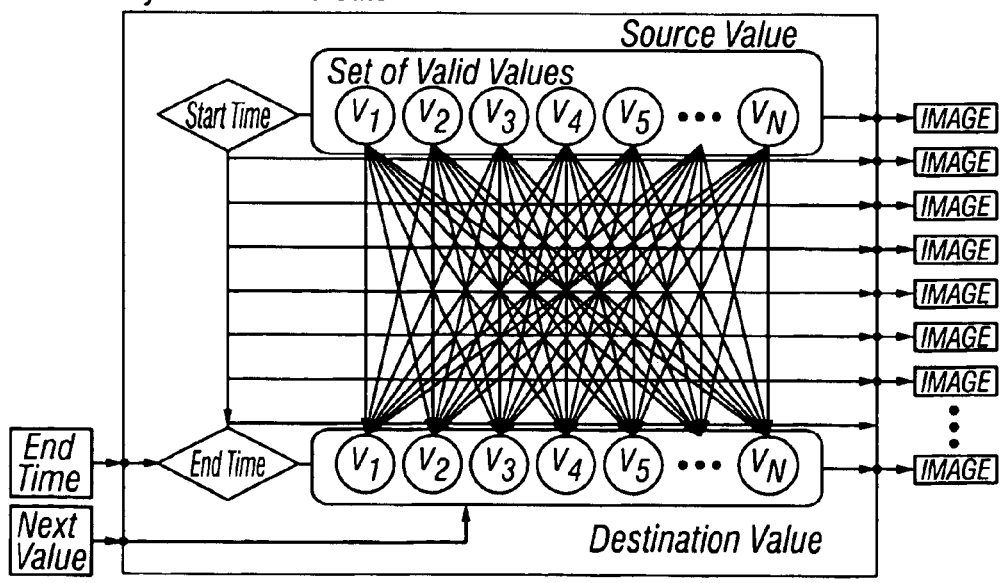
FIG. 18 is a diagrammatic representation of a dynamated indicator, such as may be effected using the software engine of FIG. 4.

Referring to FIG. 18, a dynamated indicator is shown, in accordance with the embodiment of FIGS. 1 through 10. A dynamated indicator software component provides a unique transition from every valid value to any other valid value. It enables the richest and most expressive possible animated transition for an indicator.

Each pipe arrow represents a unique means of transitioning from a specific source value to a specific destination value. It should be noted that the software component of the illustrated embodiment specifies a unique animated transition from the same source value to the same destination value.

Though FIG. 18 only shows one pipe for each source-destination value pair, the present embodiment supports multiple pipes from a single source value to a single destination value. In order to do this, the software component requires an additional input value in order to select the proper pipe.

Figure 19:
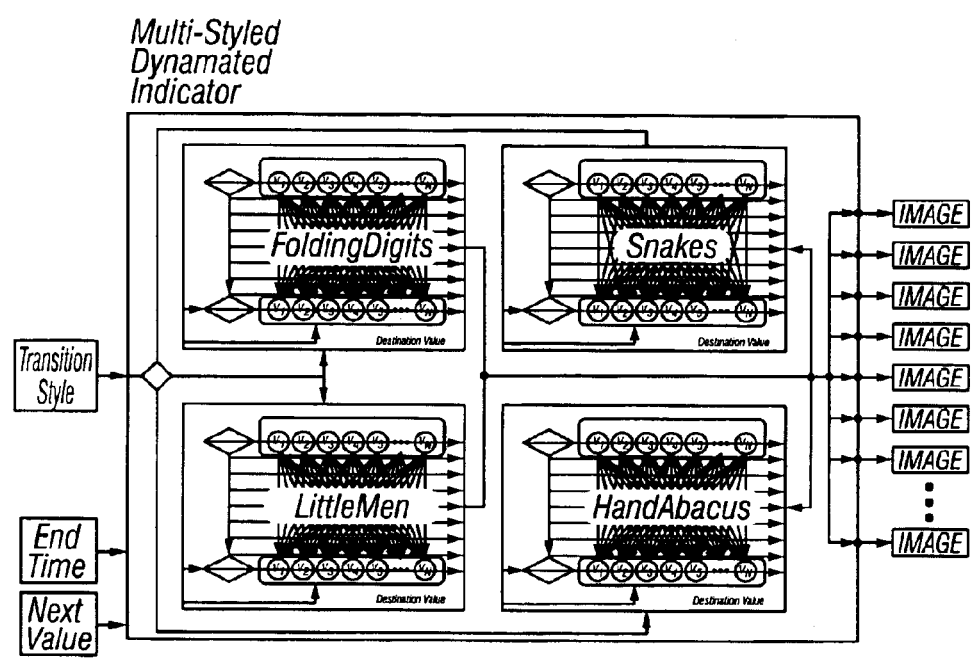
FIG. 19 is a diagrammatic representation of a multi-styled dynamated indicator, such as may be effected using the software engine of FIG. 4.
Figure 20:
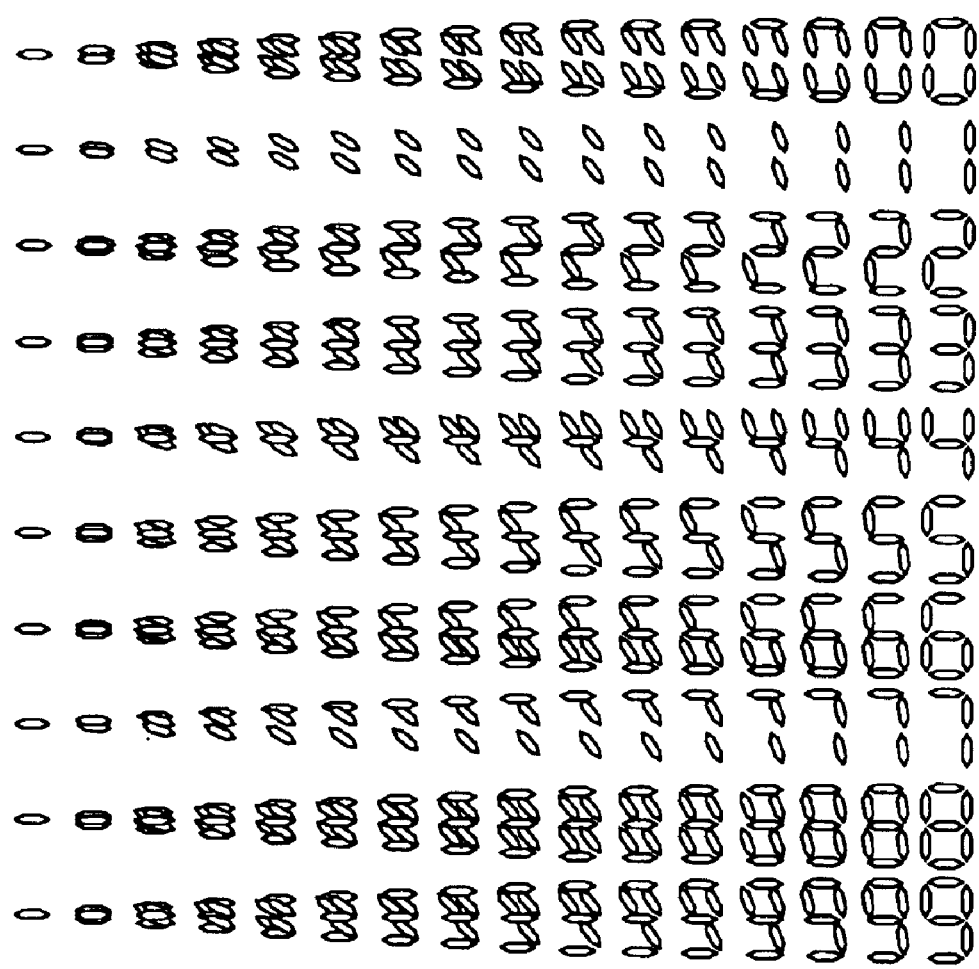
FIG. 20 is a graphical representation of transitions between a "–" value and all other values in a value set comprising digits 0 through 9, and "–"
Figure 21:
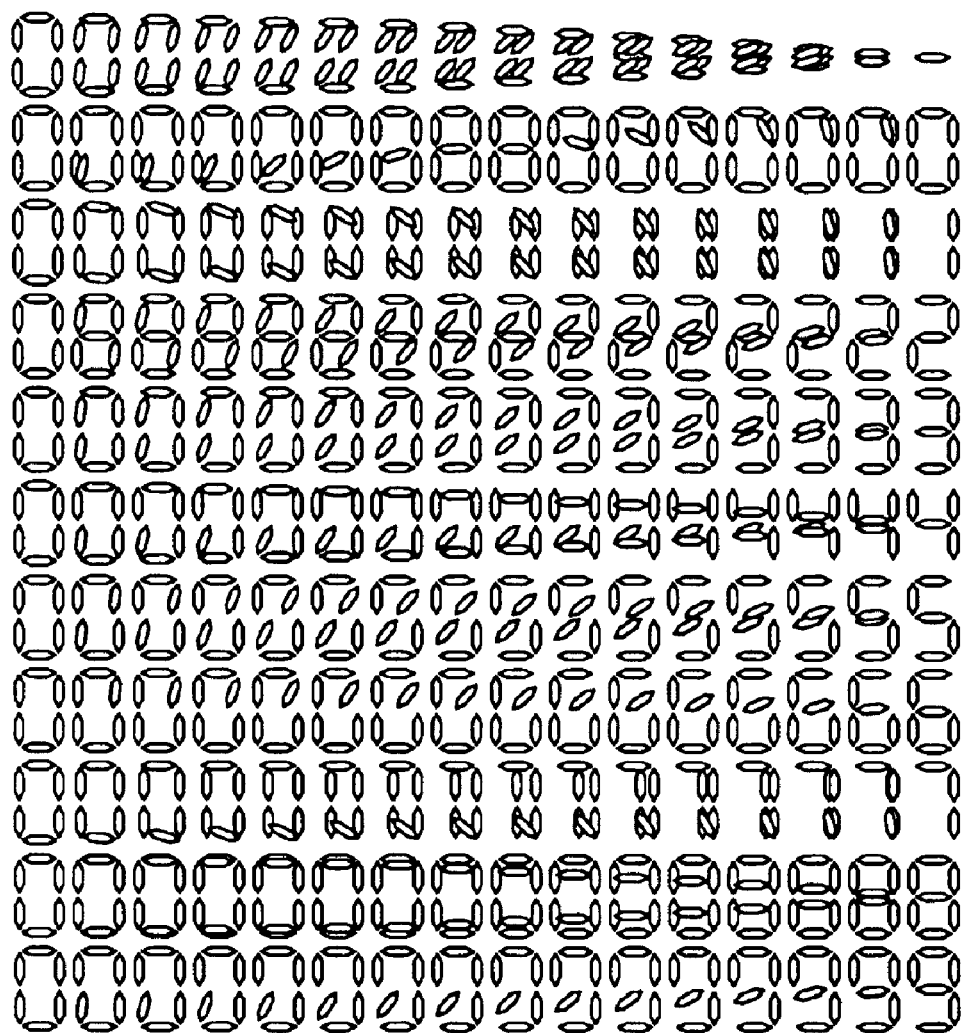
FIG. 21 is a graphical representation of transitions between a "0" value and all values in a value set comprising digits 0 through 9, and "–"
Figure 22:
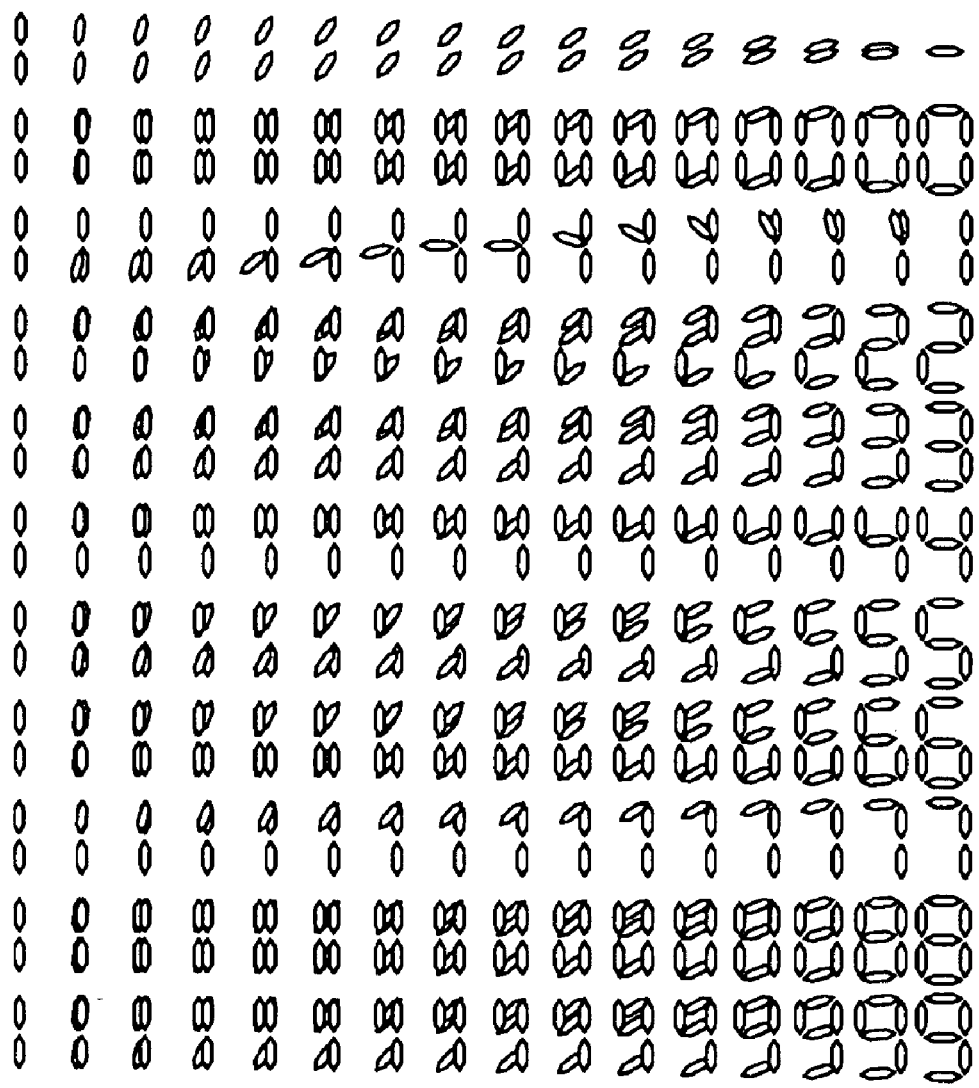
FIG. 22 is a graphical representation of transitions between a "1" value and all values in a value set comprising digits 0 through 9, and "–"
Figure 23:
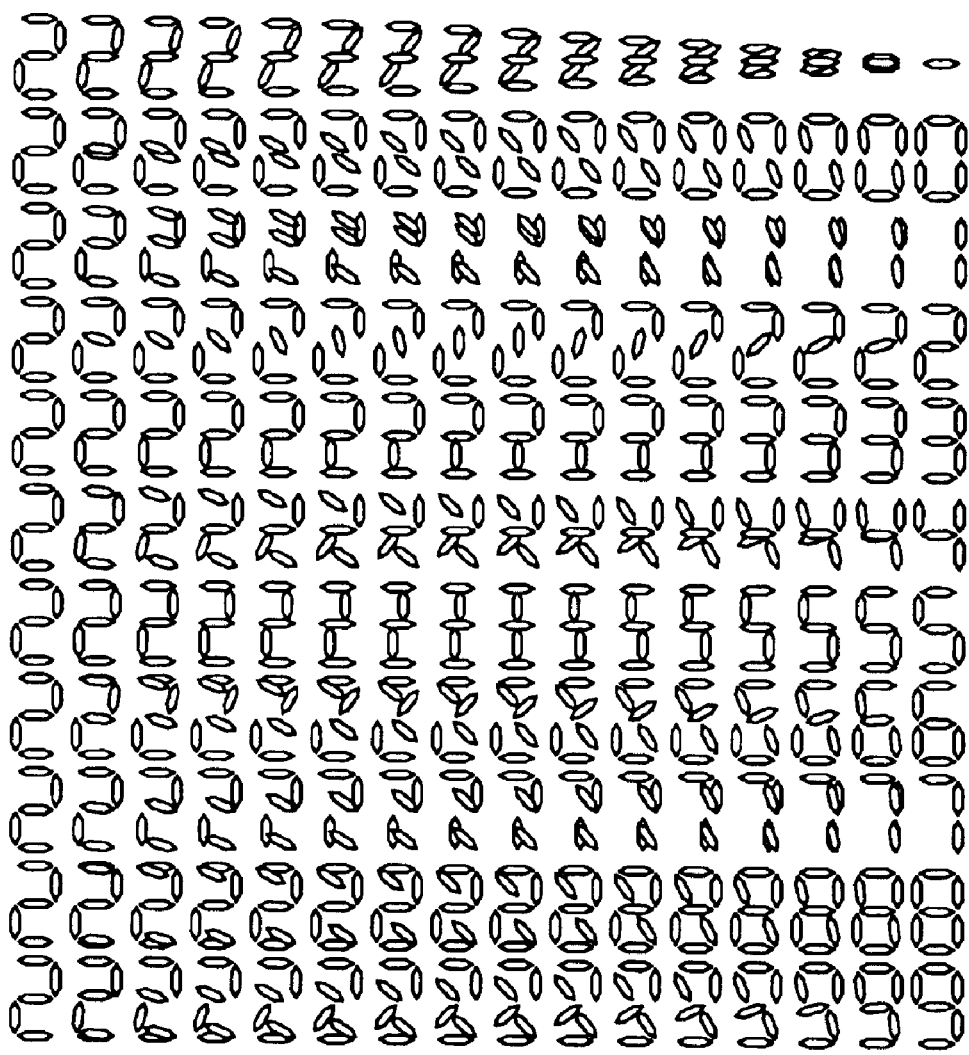
FIG. 23 is a graphical representation of transitions between a "2" value and all values in a value set comprising digits 0 through 9, and "–"
Figure 24:
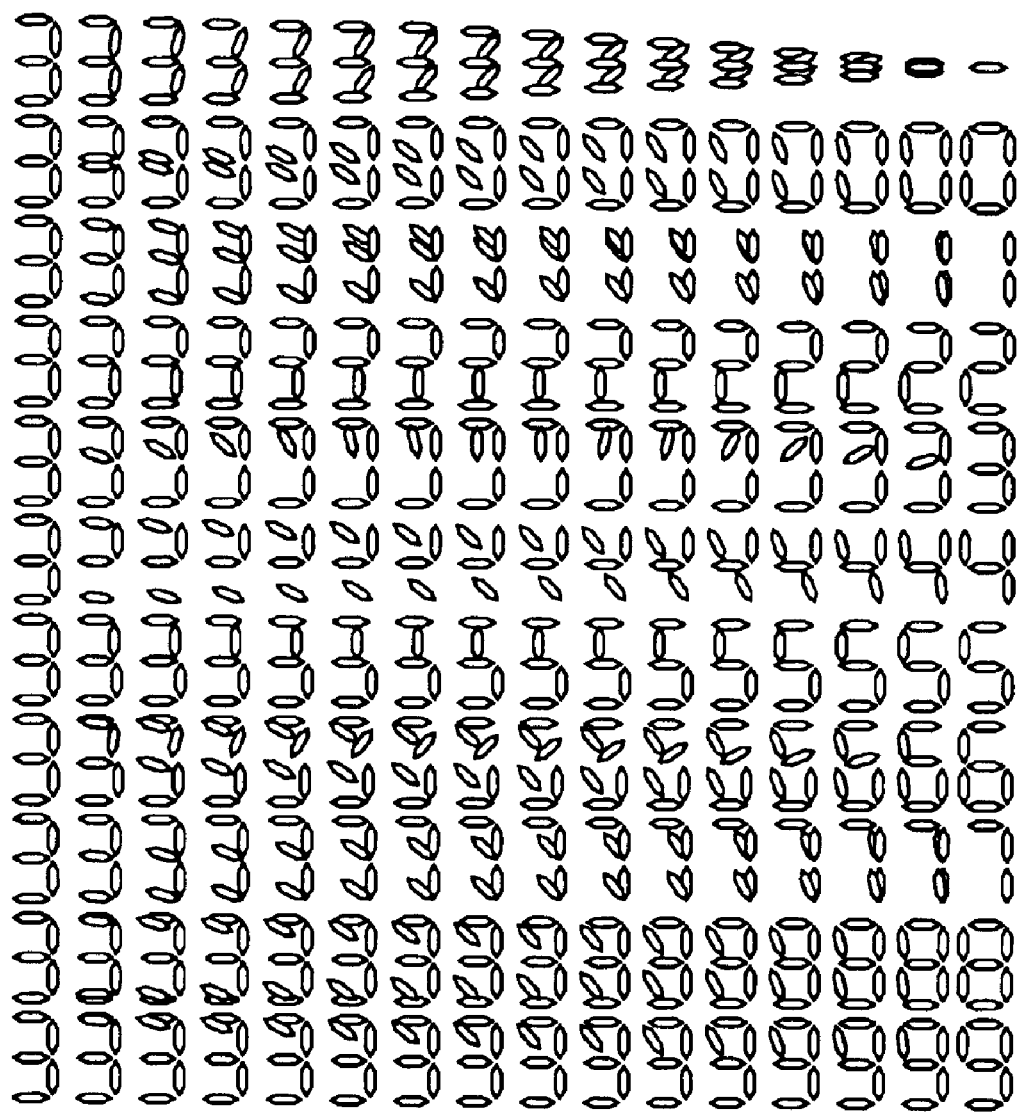
FIG. 24 is a graphical representation of transitions between a "3" value and all values in a value set comprising digits 0 through 9, and "–"

Referring to FIG. 19, a multi-styled dynamated indicator is illustrated. In addition to providing full enumeration of the unique transitions between every member of the source value set and every member of the destination value set, and to providing multiple means (pipes) for any source-destination value pair, the illustrated embodiment allows a plurality of dynamated styles to be used within the software component.

Each style defines a particular unified look for the complete set of transitions. The entire indicator can use a particular style, or each of the glyphs composing the indicator can simultaneously and independently use different styles. At any point during a transition the software component can reassign styles to glyphs.

The multi-style indicator software component accepts additional input specifying which transition styles should be used, and on what glyphs it should be used. Though the figure shows an indicator with four styles, a plurality of styles is possible.

EXAMPLE 3

On the exterior of a bank building is a time-date-temperature clock that employs a dynamated indicator instead of a typical analog or digital mechanism. In addition to being more interesting than typical clocks, the dynamated indicator allows bank customers to get a more visual and instantaneous understanding of the passage of time. On another level, the dynamated clock is used to surreptitiously communicate to police when an emergency is occurring in the bank building. The police would be alerted to this by noticing that one or more of the transitions is subtlety different than normal, such as could be effected by altering the transition style in the multi-styled dynamated indicator of FIG. 19. Depending upon which transitions are different, and how such transitions are different, various secondary information is communicated. Such information is effectively invisible to those "not in the know".

Thus the dynamated indicator can use the style and means of transition to communicate secondary information beyond the primary data being displayed. This dual level of information allows "secret" information to be communicated in plain sight. The secondary information is "effectively encrypted" to a viewer without the knowledge that the secondary information is present; or to a viewer without the knowledge of how to decode and interpret the secondary information. The viewer doesn't need to be a person but could also be an animal, or a machine designed to interpret the primary and/or secondary information.

EXAMPLE 4

The dynamated indicator can be used to display time in new ways that haven't been possible before. Normally on a digital clock four or six digits are shown at once, displaying the hours and minutes, or hours, minutes, and seconds respectively. Some clocks will intermittently alternate between displaying the time and date. In a four-digit clock the hour changes to the month, and the minutes change to the day. In a six-digit clock the behavior is similar except the second also changes to the year. Of course nations outside the United States often configure their dates in other arrangements, but the behavior of the intermittent transition is similar.

Using the dynamated indicator, the transition between these modes of information can be fully animated in a more interesting and captivating manner. Furthermore, the letter abbreviations of the months and day can be shown in an intermitted animated manner as well. While this example is in the context of four and six digit/character clocks it can be extrapolated to other formats as well.

One format that has not been done is a clock that only show two digits/characters of the time and date ate once. We surmise that this has not been done for two main reasons: 1) the conventional wisdom is there is no need to reduce the information shown to two characters when one already has four or six available; 2) there are not enough clues available from just two displayed characters to distinguish which part of the date-time the two characters represent.

Using a dynamated indicator however, enables the time and date to be shown effectively using just two characters. Then using a smooth animated transition, and using different tempos of transition between one time-date unit to another, allows one to focus on and detect which unit of date-time is being displayed. If one only has a small visual area to display the date and time, using two characters allows them to be much bigger in the display area, and therefore, much easier to read. This is particularly advantageous in small products such as watches, and on the display of small consumer electronic products such as PDA, microwaves, etc.

Referring to FIGS. 20 through 30, examples transitions are shown between all values in a value set comprising digits 0 through 9, and "–" are shown. Transitions to "–" are reverse transitions from the transitions illustrated in FIG. 20. In FIGS. 21 through 30, a left-most column represents an image generated as a result of a static start value, with each successive column (moving to the right) representing a transition image at a time subsequent to a time at which the image in the column to its right is generated. The right-most column represents an image generated as a result of a static destination value. The animation style is marketed under the name FOLDING DIGITS animation style.

While the invention herein disclosed has been described by means of specific embodiments and applications thereof, numerous modifications and variations could be made thereto by those skilled in the art without departing from the scope of the invention set forth in the claims.

What is claimed is:

1. A method of displaying an image comprising:
    displaying a first glyph, the first glyph comprising a plurality of sub-glyphs;
    manipulating the sub-glyphs; and
    displaying a second glyph.
2. The method of claim 1 further comprising decreasing a number of the sub-glyphs.
3. The method of claim 2 further comprising decreasing a number of the sub-glyphs.
4. The method of claim 1 wherein the manipulating is a function of the firts glyph and the second glyph.
5. The method of claim 1 wherein the firts glyphs has a plurality of properties.
6. The method of claim 5 wherein the sub-glyphs inherit the plurality of properties from the firts glyph.

* * * * *

UNITED STATES PATENT AND TRADEMARK OFFICE
CERTIFICATE OF CORRECTION

PATENT NO.        : 7,002,583 B2
APPLICATION NO. : 09/922498
DATED             : February 21, 2006
INVENTOR(S)       : Rabb, III It is certified that error appears in the above-identified patent and that said Letters Patent is hereby corrected as shown below:

On the Title PAGE (75):

Under Inventor, after "Rabb" delete "," (comma).

In the CLAIMS:

Claim 2, column 28, line 18, delete "decreasing" and insert --increasing--.

Claim 4, column 28, line 23, delete "firts" and insert --first--.

Claim 5, column 28, line 24, delete "firts glyphs" and insert --first glyph--.

Claim 6, column 28, line 27, delete "firts" and insert --first--.

Signed and Sealed this

Twelfth Day of December, 2006

JON W. DUDAS
*Director of the United States Patent and Trademark Office*